(12) United States Patent
Xu et al.

(10) Patent No.: US 11,758,164 B2
(45) Date of Patent: Sep. 12, 2023

(54) METHOD AND APPARATUS FOR VIDEO CODING

(71) Applicant: Tencent America LLC, Palo Alto, CA (US)

(72) Inventors: Xiaozhong Xu, State College, PA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/600,736

(22) Filed: Oct. 14, 2019

(65) Prior Publication Data

US 2020/0128266 A1 Apr. 23, 2020

Related U.S. Application Data

(60) Provisional application No. 62/780,157, filed on Dec. 14, 2018, provisional application No. 62/749,486, filed on Oct. 23, 2018.

(51) Int. Cl.
*H04N 19/44* (2014.01)
*H04N 19/159* (2014.01)
(Continued)

(52) U.S. Cl.
CPC ........... *H04N 19/44* (2014.11); *H04N 19/105* (2014.11); *H04N 19/132* (2014.11);
(Continued)

(58) Field of Classification Search
CPC .. H04N 19/105; H04N 19/132; H04N 19/134; H04N 19/137; H04N 19/159;
(Continued)

(56) References Cited

U.S. PATENT DOCUMENTS

2007/0047642 A1* 3/2007 Erlandson .............. H04N 19/61
375/E7.129
2008/0285655 A1* 11/2008 Au ......................... H04N 19/51
375/240.16
(Continued)

FOREIGN PATENT DOCUMENTS

CN 105493505 A 4/2016
WO 2016057938 A1 4/2016
(Continued)

OTHER PUBLICATIONS

Bross et al., "Versatile Video Coding Draft 3," Joint Video Experts Team JVET of ITU-T SG 16 WP 3 and ISO/IEC JTC 1/SC 29/WG 11, 12th Meeting: Macao, CN, Oct. 3-12, 2018, Document: JVET-L1001, 235 pages.
(Continued)

*Primary Examiner* — Peter D Le
(74) *Attorney, Agent, or Firm* — ARENTFOX SCHIFF LLP

(57) ABSTRACT

Aspects of the disclosure provide methods and apparatuses for video encoding/decoding. In some examples, an apparatus for video decoding includes receiving circuitry and processing circuitry. The processing circuitry decodes prediction information of a current block within a current picture from a coded video bitstream. The prediction information is indicative of usage information of an inter prediction mode that is not compatible with using the current picture as a reference picture for the current block. Then, the processing circuitry determines whether the coded video bitstream is valid based on a conformance check of the usage information to the reference picture for the current block.

12 Claims, 19 Drawing Sheets

(51) Int. Cl.
*H04N 19/105* (2014.01)
*H04N 19/176* (2014.01)
*H04N 19/132* (2014.01)
*H04N 19/46* (2014.01)
*H04N 19/137* (2014.01)

(52) U.S. Cl.
CPC ......... *H04N 19/137* (2014.11); *H04N 19/159* (2014.11); *H04N 19/176* (2014.11); *H04N 19/46* (2014.11)

(58) Field of Classification Search
CPC ...... H04N 19/176; H04N 19/44; H04N 19/46; H04N 19/52
See application file for complete search history.

(56) References Cited

U.S. PATENT DOCUMENTS

| | | | |
|---|---|---|---|
| 2010/0002692 A1* | 1/2010 | Bims | H04L 1/0018 370/389 |
| 2012/0189053 A1* | 7/2012 | Chen | H04N 19/56 375/240.12 |
| 2012/0189055 A1* | 7/2012 | Chien | H04N 19/463 375/240.14 |
| 2012/0230408 A1* | 9/2012 | Zhou | H04N 19/105 375/240.15 |
| 2012/0300839 A1* | 11/2012 | Sze | H04N 19/91 375/240.12 |
| 2012/0320969 A1* | 12/2012 | Zheng | H04N 19/40 375/240.02 |
| 2012/0320984 A1* | 12/2012 | Zhou | H04N 19/463 375/240.16 |
| 2013/0188715 A1* | 7/2013 | Seregin | H04N 19/61 375/240.16 |
| 2013/0301736 A1* | 11/2013 | Sugio | H04N 19/137 375/240.16 |
| 2013/0308708 A1* | 11/2013 | Sugio | H04N 19/172 375/240.24 |
| 2013/0336406 A1* | 12/2013 | Zhang | H04N 19/105 375/240.16 |
| 2014/0049605 A1* | 2/2014 | Chen | H04N 19/52 348/43 |
| 2014/0105302 A1* | 4/2014 | Takehara | H04N 19/176 375/240.15 |
| 2014/0153647 A1* | 6/2014 | Nakamura | H04N 19/52 375/240.14 |
| 2014/0205014 A1* | 7/2014 | Nakamura | H04N 19/577 375/240.16 |
| 2014/0211857 A1* | 7/2014 | Sugio | H04N 19/513 375/240.16 |
| 2015/0049813 A1* | 2/2015 | Tabatabai | H04N 19/513 375/240.16 |
| 2015/0103911 A1* | 4/2015 | Lee | H04N 19/463 375/240.15 |
| 2015/0264374 A1* | 9/2015 | Xiu | H04N 19/46 375/240.25 |
| 2015/0334405 A1* | 11/2015 | Rosewarne | H04N 19/593 375/240.02 |
| 2015/0373357 A1 | 12/2015 | Pang et al. | |
| 2015/0373358 A1* | 12/2015 | Pang | H04N 19/176 375/240.12 |
| 2016/0057420 A1* | 2/2016 | Pang | H04N 19/593 375/240.16 |
| 2016/0100163 A1* | 4/2016 | Rapaka | H04N 19/182 375/240.16 |
| 2016/0100189 A1* | 4/2016 | Pang | H04N 19/593 375/240.13 |
| 2016/0105670 A1* | 4/2016 | Pang | H04N 19/70 375/240.16 |
| 2016/0330474 A1 | 11/2016 | Liu et al. | |
| 2016/0353117 A1* | 12/2016 | Seregin | H04N 19/42 |
| 2017/0034526 A1* | 2/2017 | Rapaka | H04N 19/593 |
| 2017/0054996 A1 | 2/2017 | Xu et al. | |
| 2017/0085899 A1* | 3/2017 | Oh | H04N 19/159 |
| 2017/0094271 A1 | 3/2017 | Liu et al. | |
| 2017/0099490 A1* | 4/2017 | Seregin | H04N 19/176 |
| 2017/0127082 A1* | 5/2017 | Chen | H04N 19/176 |
| 2017/0195676 A1* | 7/2017 | Chuang | H04N 19/11 |
| 2017/0195677 A1 | 7/2017 | Ye et al. | |
| 2017/0214932 A1* | 7/2017 | Huang | H04N 19/52 |
| 2017/0280159 A1 | 9/2017 | Xu et al. | |
| 2017/0289566 A1* | 10/2017 | He | H04N 19/52 |
| 2017/0295370 A1 | 10/2017 | Xu et al. | |
| 2017/0310961 A1* | 10/2017 | Liu | H04N 19/573 |
| 2017/0332099 A1* | 11/2017 | Lee | H04N 19/52 |
| 2018/0014011 A1* | 1/2018 | He | H04N 19/176 |
| 2018/0020218 A1* | 1/2018 | Zhao | H04N 19/176 |
| 2018/0124415 A1* | 5/2018 | Van Leuven | H04N 19/159 |
| 2018/0131963 A1* | 5/2018 | Chuang | H04N 19/176 |
| 2018/0176562 A1* | 6/2018 | Iwamura | H04N 19/625 |
| 2018/0176596 A1* | 6/2018 | Jeong | H04N 19/523 |
| 2018/0376137 A1* | 12/2018 | Jun | H04N 19/573 |
| 2019/0166371 A1* | 5/2019 | Zheng | H04N 19/105 |
| 2019/0335208 A1* | 10/2019 | Lim | H04N 19/157 |
| 2019/0387247 A1* | 12/2019 | Huang | H04N 19/52 |
| 2020/0137400 A1* | 4/2020 | Seregin | H04N 19/176 |
| 2020/0396465 A1* | 12/2020 | Zhang | H04N 19/176 |
| 2020/0404289 A1* | 12/2020 | Li | H04N 19/184 |

FOREIGN PATENT DOCUMENTS

| | | |
|---|---|---|
| WO | 2016188447 A1 | 12/2016 |
| WO | 2018099269 A1 | 6/2018 |

OTHER PUBLICATIONS

Chen et al., "Algorithm Description of Joint Exploration Test Model 7 JEM 7," Joint Video Exploration Team JVET of ITU-T SG 16 WP 3 and ISO/IEC JTC 1/SC 29/WG 11, 7th Meeting: Torino, IT, Jul. 13-21, 2017, Document: JVET-G1001-v1, 50 pages.

Chen et al., "Intra Line Copy for HEVC Screen Content Intra-Picture Prediction," IEEE Transactions on Circuits and Systems for Video Technology, Jul. 2017, vol. 27, No. 7, pp. 1568-1579.

Chiang et al., "CE10.1.1: Multi-hypothesis prediction for improving AMVP mode, skip or merge mode, and intra mode," Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0100, 14 pages.

Extended European Search Report in EP19875682.7, dated Feb. 2, 2022, 11 pages.

International Telecommunication Union, "High efficiency video coding," ITU-T, Telecommunication Standardization Sector of ITU, Dec. 2016, 664 pages.

Joshi et al., "High Efficiency Video Coding (HEVC) Screen Content Coding: Draft 3," Joint Collaborative Team on Video Coding (JCT-VC) of ITU-T SG 16 WP 3 and ISO/IEC JTC 1/SC 29/WG 11, 20th Meeting: Geneva, CH, Feb. 10-17, 2015, Document: JCTVC-T1005, 57 pages.

Joshi et al., "High Efficiency Video Coding (HEVC) Screen Content Coding: Draft 6," Joint Collaborative Team on Video Coding (JCT-VC) of ITU-T SG 16 WP 3 and ISO/IEC JTC 1/SC 29/WG 11, 23rd Meeting: San Diego, USA, Feb. 19-26, 2016, Document: JCTVC-W1005, 1005 pages.

Joshi et al., "Screen content coding test model 5 (SCM 5)," Joint Collaborative Team on Video Coding (JCT-VC) of ITU-T SG 16 WP 3 and ISO/IEC JTC 1/SC 29/WG 11, 21st Meeting: Warsaw, PL, Jun. 19-26, 2015, Document: JCTVC-U1014, 12 pages.

Lai et al., "AHG14: Intra Block Copy reference area for Wavefront Parallel Processing (WPP)," Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, Document: JCTVC-S0101, 4 pages.

Lainema et al., "Intra Coding of the HEVC Standard," IEEE Transactions on Circuits and Systems for Video Technology, Dec. 2012, vol. 22, No. 12, pp. 1792-1801.

(56) References Cited

OTHER PUBLICATIONS

Liao et al., "CE10.3.1.b: Triangular prediction unit mode," Joint Video Exploration Team (JVET) of ITU-T SG 16 WP 3 and ISO/IEC JTC 1/SC 29/WG 11, 12th Meeting: Macao, CN, Oct. 3-12, 2018, Document: JVET-L0124, 6 pages.

Liu et al., "Overview of HEVC extensions on screen content coding," APSIPA Transactions on Signal and Information Processing, 2015, vol. 4, e10, 12 pages.

Office Action in CN201980069352.3, dated Nov. 2, 2022, 9 pages.

Rapaka et al., "Bandwidth reduction method for intra block copy," Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, Document: JCTVC-S0145, 3 pages.

Sullivan et al., "Overview of the High Efficiency Video Coding (HEVC) Standard," IEEE Transactions on Circuits and Systems for Video Technology, Dec. 2022, vol. 22, No. 12, pp. 1649-1668.

Sun et al., "Improvements of HEVC SCC Palette Mode and Intra Block Copy," IEEE Journal on Emerging and Selected Topics in Circuits and Systems, 2016, vol. 6, No. 4, pp. 433-445.

Xu et al., "Bug fix for DPB operations when current picture is a reference picture," Joint Collaborative Team on Video Coding (JCT-VC) of ITU-T SG 16 WP 3 and ISO/IEC JTC 1/SC 29/WG 11, 23rd Meeting: San Diego, USA, Feb. 19-26, 2016, Document: JCTVC-W0077, 5 pages.

Xu et al., "CE8-2.2: Current picture referencing using reference index signaling," Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0076, 9 pages.

Xu et al., "CE8: CPR mode with local search ranges (Test CE8.3.1 and CE8.3.2)," Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0293, 5 pages.

Xu et al., "DPB considerations when current picture is a reference picture," Joint Collaborative Team on Video Coding (JCT-VC) of ITU-T SG 16 WP 3 and ISO/IEC JTC 1/SC 29/WG 11, 22nd Meeting: Geneva, CH, Oct. 15-21, 2015, Document: JCTVC-V0057, 5 pages.

Xu et al., "Non-CE2: Intra BC merge mode with default candidates," Joint Collaborative Team on Video Coding (JCT-VC) of ITU-T SG 16 WP 3 and ISO/IEC JTC 1/SC 29 WG 11, 19th Meeting: Strasbourg, FR, Oct. 17-24, 2014, Document: JCTVC-S0123, 7 pages.

Xu et al., "On chroma motion vector derivation for intra block copy," Joint Collaborative Team on Video Coding (JCT-VC) of ITU-T SG 16 WP 3 and ISO/IEC JTC 1/SC 29/WG 11, 21st Meeting: Warsaw, PL, Jun. 19-26, 2015, Document: JCTVC-U0077, 10 pages.

Xu et al., "On intra block copy signalling and constraints," Joint Collaborative Team on Video Coding (JCT-VC) of ITU-T SG 16 WP 3 and ISO-IEC JTC 1/SC 29/WG 11, 22nd Meeting: Geneva, CH, Oct. 15-21, 2015, Document: JCTVC-V0056, 5 pages.

Xu et al., "On reference picture list construction for intra block copy," Joint Collaborative Team on Video Coding (JCT-VC) of ITU-T SG 16 WP 3 and ISO/IEC JTC 1/SC 29/WG 11, 21st Meeting: Warsaw, PL, Jun. 19-26, 2015, Document: JCTVC-U0113, 6 pages.

Xu et al., "On storage of filtered and unfiltered current decoded pictures," Joint Collaborative Team on Video Coding (JTC-VC) of ITU-T SG 16 WP 3 and ISO/IEC JTC 1/SC 29/WG 11, 21st Meeting: Warsaw, PL, Jun. 19-26, 2015, Document: JCTVC-U0181, 2 pages.

Xu et al., "Intra Block Copy in HEVC Screen Content Coding Extensions," IEEE J. Emerg. Sel. Topics Circuits Syst., 2016, vol. 6, No. 4, pp. 409-419.

Xu et al., "Block Vector Prediction in Intra Block Copy for HEVC Screen Content Coding," Data Compression Conference (DCC), Apr. 2015, pp. 273-282.

Zhang et al., "Planar Motion Vector Prediction," Joint Video Experts Team (JVET) of ITU-T SG 16 WP 3 and ISO/IEC JTC 1/SC 29/WG 11, 10th Meeting: San Diego, US, Apr. 10-20, 2018, Document: JVET-J0061, 4 pages.

* cited by examiner

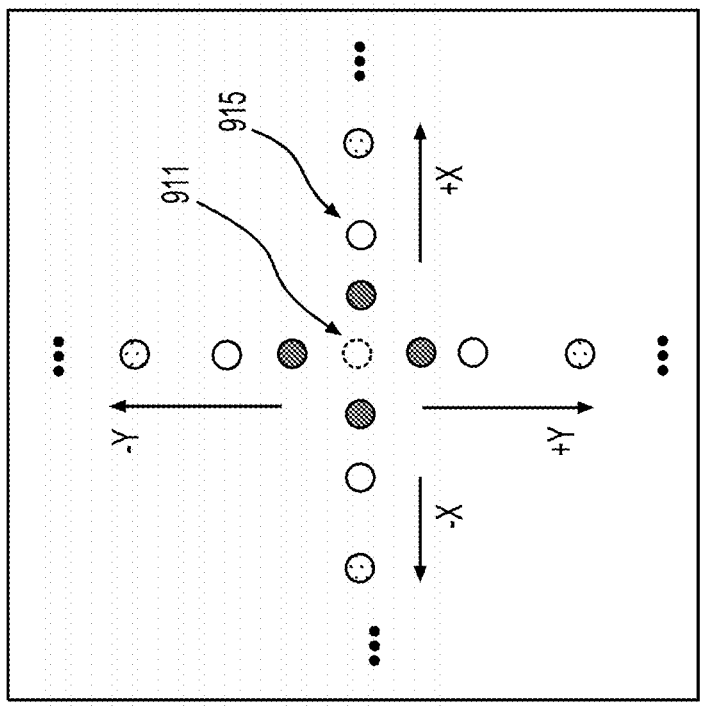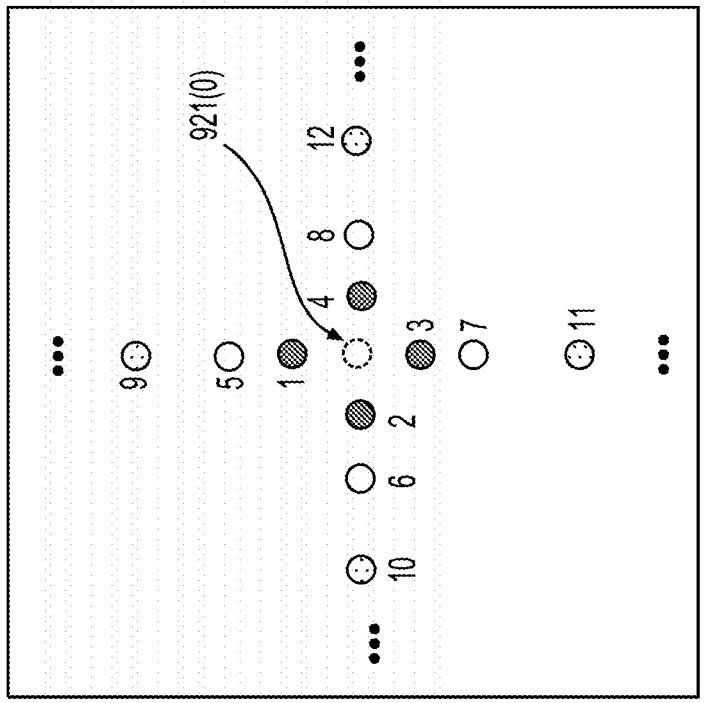
FIG. 9

METHOD AND APPARATUS FOR VIDEO CODING

INCORPORATION BY REFERENCE

This present application claims the benefit of priority to U.S. Provisional Application No. 62/749,486, "SUB-BLOCK BASED TEMPORAL MOTION VECTOR PREDICTION" filed on Oct. 23, 2018, and U.S. Provisional Application No. 62/780,157, "CONSTRAINTS ON CURRENT PICTURE REFERENCING AND INTER CODING TOOLS" filed on Dec. 14, 2018. The entire disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

SUMMARY

Aspects of the disclosure provide methods and apparatuses for video encoding/decoding. In some examples, an apparatus for video decoding includes receiving circuitry and processing circuitry. The processing circuitry decodes prediction information of a current block within a current picture from a coded video bitstream. The prediction information is indicative of usage information of an inter prediction mode that is not compatible with using the current picture as a reference picture for the current block. Then, the processing circuitry determines whether the coded video bitstream is valid based on a conformance check of the usage information to the reference picture for the current block.

In some embodiments, the processing circuitry determines that the coded video bitstream is invalid when the reference picture for the current block is the current picture and the prediction information indicates that the inter prediction modes that is not compatible with using the current picture as the reference picture for the current block has been used.

In some examples, the prediction information indicates a usage flag for at least one of an affine merge mode, a merge mode with motion vector difference, a triangular prediction mode, and an intra-inter mode.

In an embodiment, when the inter prediction mode excludes a motion vector candidate with the current picture being the reference picture from a derivation process for determining a motion vector for the current block, the processing circuitry determines that the coded video bitstream is invalid when the usage information indicates that the inter prediction mode has been used, and at least one motion vector candidate for the current block uses the current picture as the reference picture. In some examples, the processing circuitry determines that the coded video bitstream is invalid when the usage information indicates that the inter prediction mode has been used, and all motion vector candidates for the current block use the current picture as the reference picture. In an example, the processing circuitry determines that the coded video bitstream is invalid when a reference picture list includes only the current picture.

In another embodiment, when the inter prediction mode excludes a motion vector candidate that uses the current picture as the reference picture from a derivation process for determining a motion vector for the current block, the processing circuitry infers that the inter prediction mode is not in use when a reference picture list includes only the current picture.

In another embodiment, when all motion vector candidates for the current block use the current picture as the reference picture, the processing circuitry reconstructs samples of the current block based on a default motion vector with a temporal reference picture other than the current picture. In an example, the processing circuitry combines merge indexes of motion vectors with reference indexes for reference pictures in a circular manner to form merge candidates. Further, in an example, the processing circuitry reconstructs the samples of the current block based on a zero motion vector with the temporal reference picture other than the current picture in the reference picture list.

In another embodiment, the processing circuitry excludes the current picture as the reference picture for zero motion vector candidates during a construction of a merge list.

In some embodiments, the processing circuitry decodes prediction information of a current block within a current picture from a coded video bitstream. The prediction information is indicative of a sub-block based temporal motion vector prediction. Then, the processing circuitry checks whether a merge candidate uses the current picture as a reference picture, and determines a reference block based on the checking whether the merge candidate uses the current picture as the reference picture. Further, the processing circuitry determines respective motion information of sub-blocks of the current block based on corresponding sub-blocks of the reference block, and reconstructs samples of the sub-blocks of the current block based on the respective motion information of the sub-blocks.

In an embodiment, when the checking indicates that the merge candidate uses the current picture as the reference picture, the processing circuitry determines the reference block in a collocated reference picture based on a vector of the merge candidate without scaling the vector. Further, when the checking indicates that the merge candidate uses the current picture as the reference picture, the processing circuitry excludes the merge candidate for determining the reference block.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 9 shows examples for MMVD according to an embodiment of the disclosure.

DETAILED DESCRIPTION OF EMBODIMENTS

Figure 1:
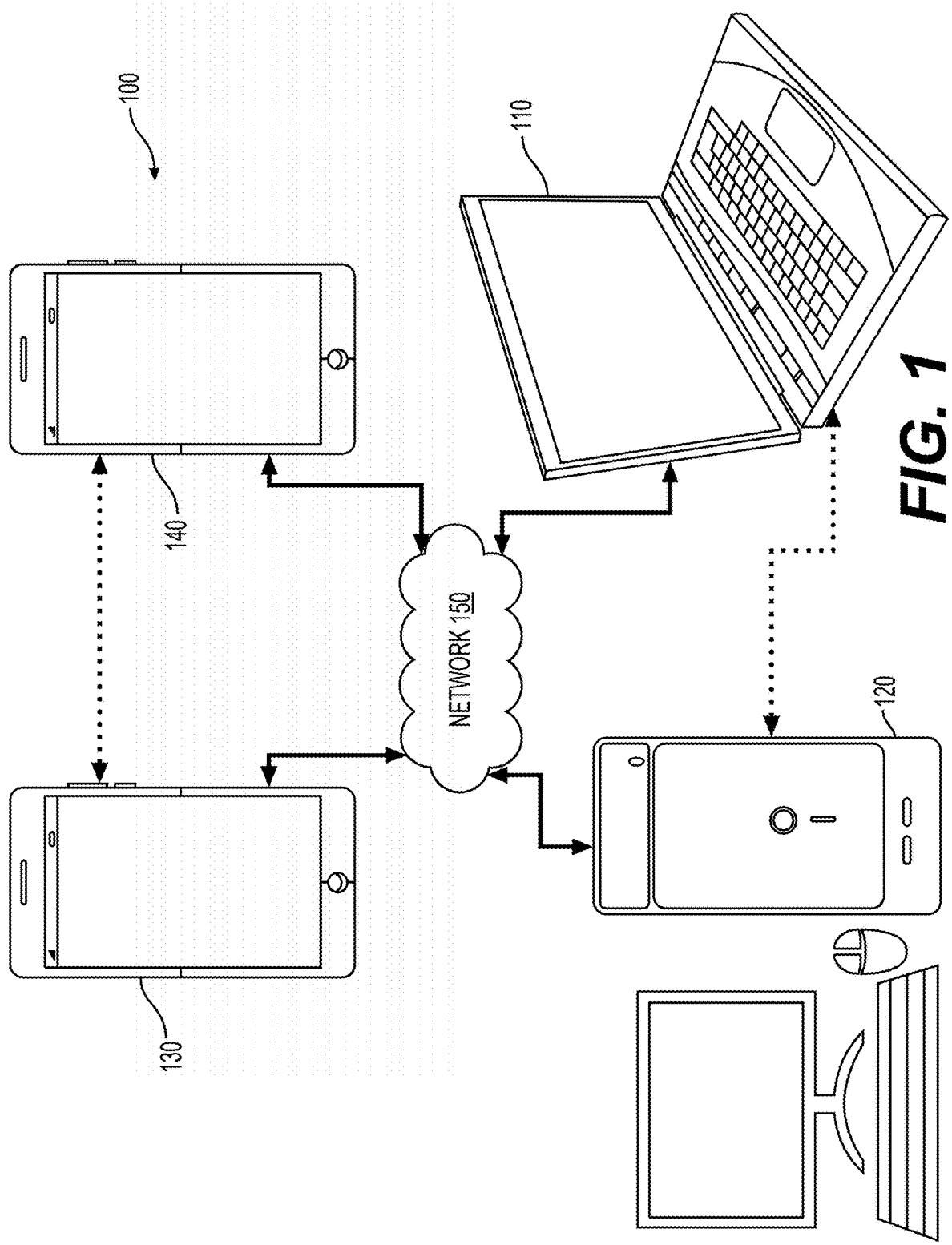
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
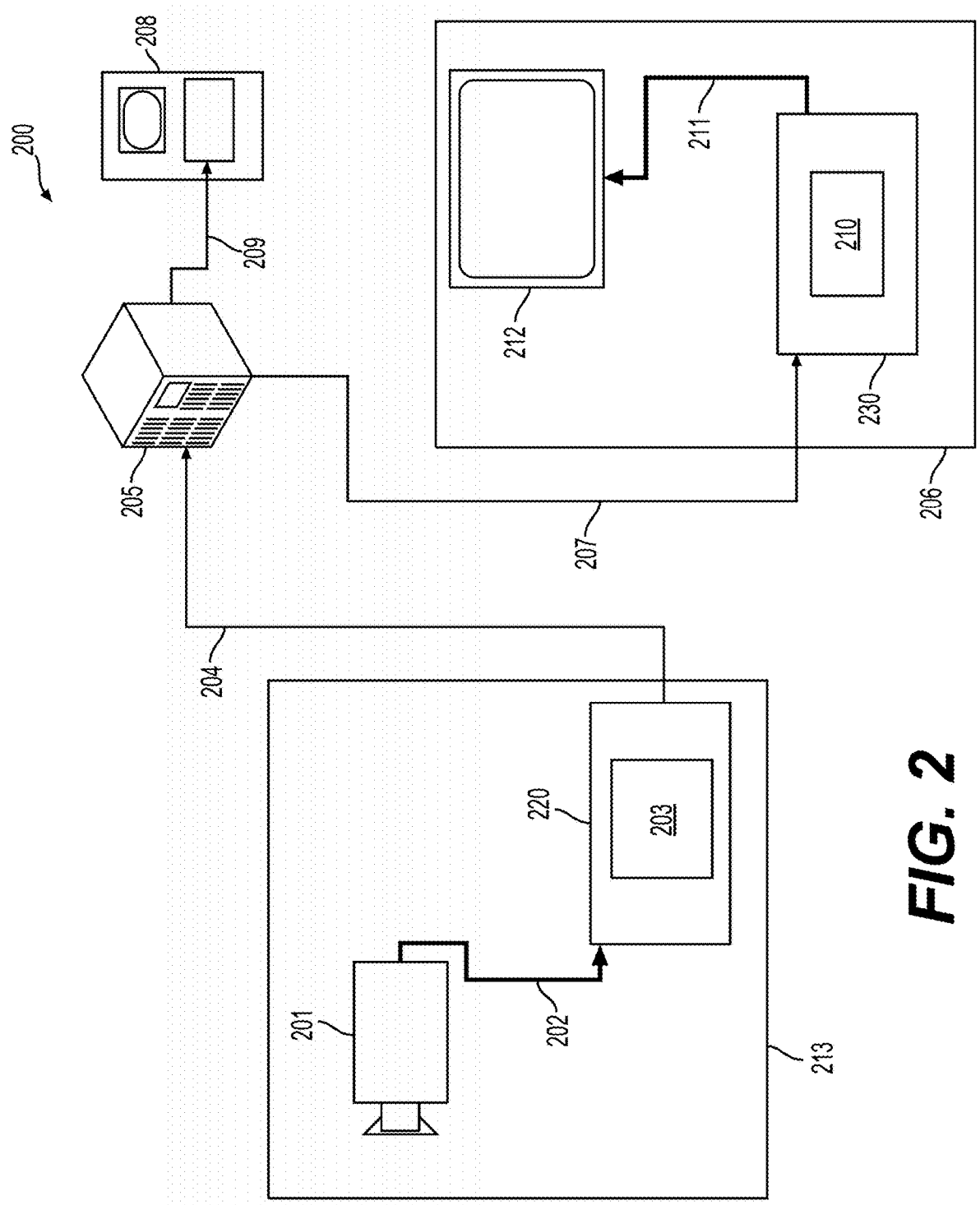
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
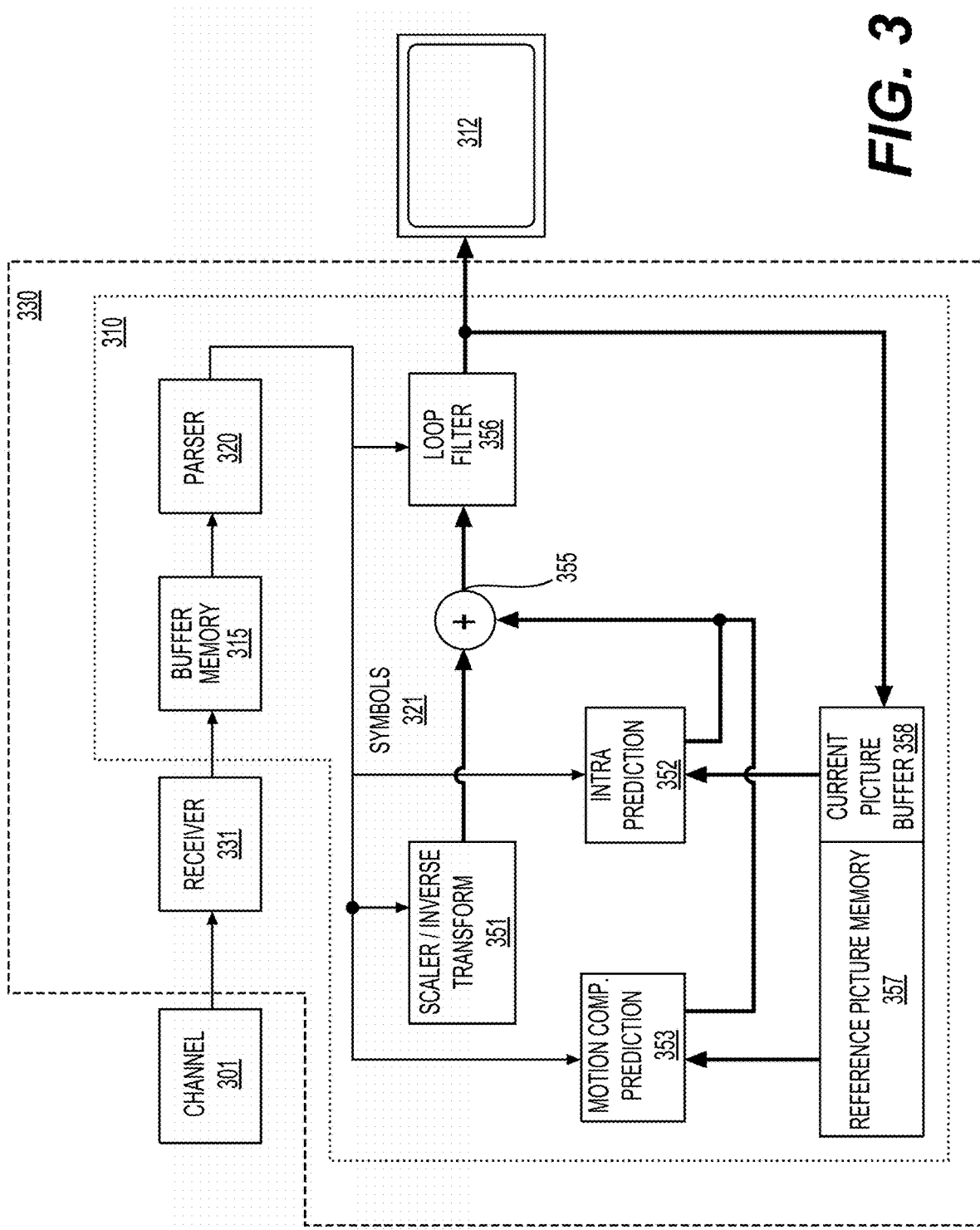
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplemental Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
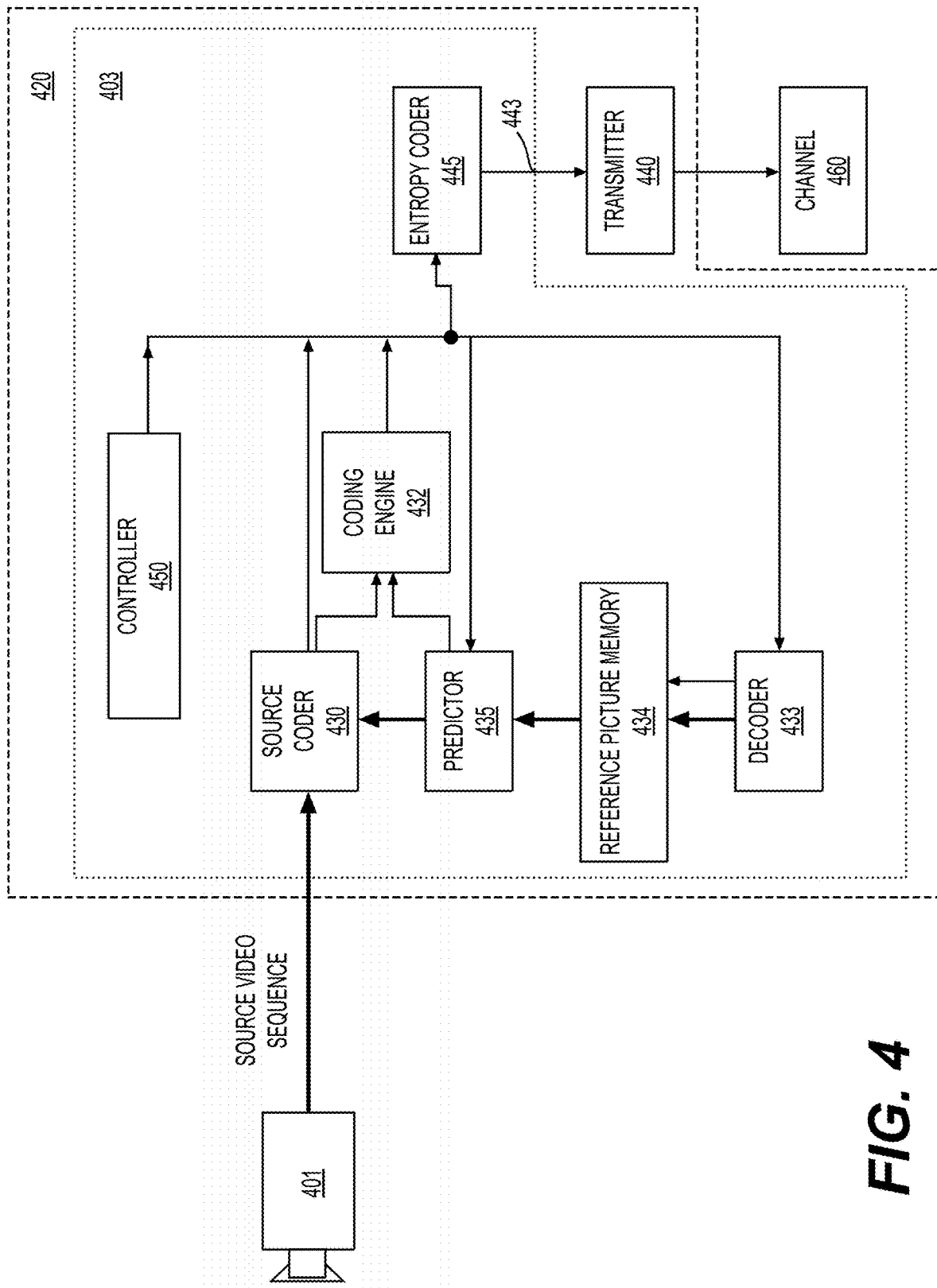
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
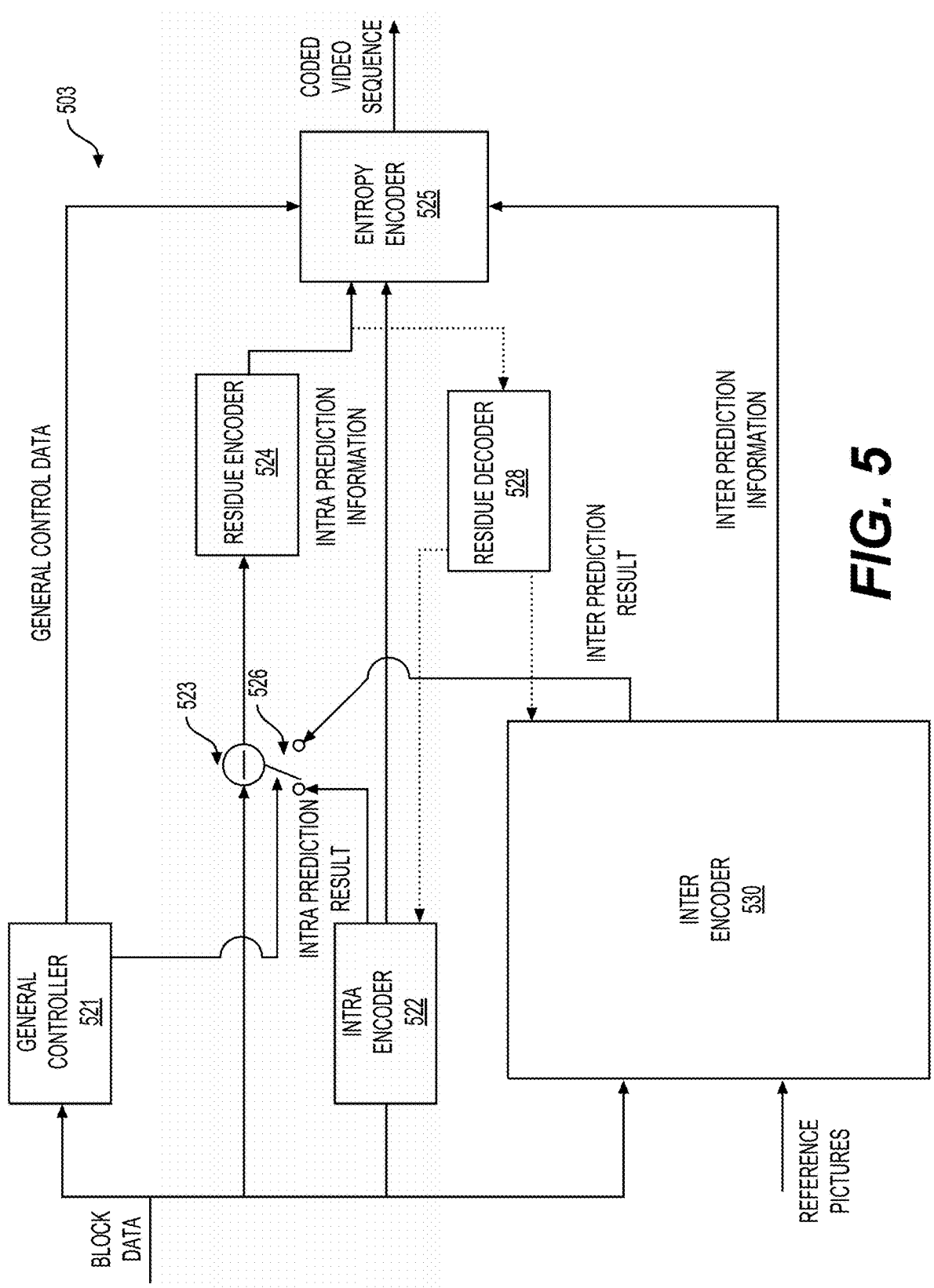
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
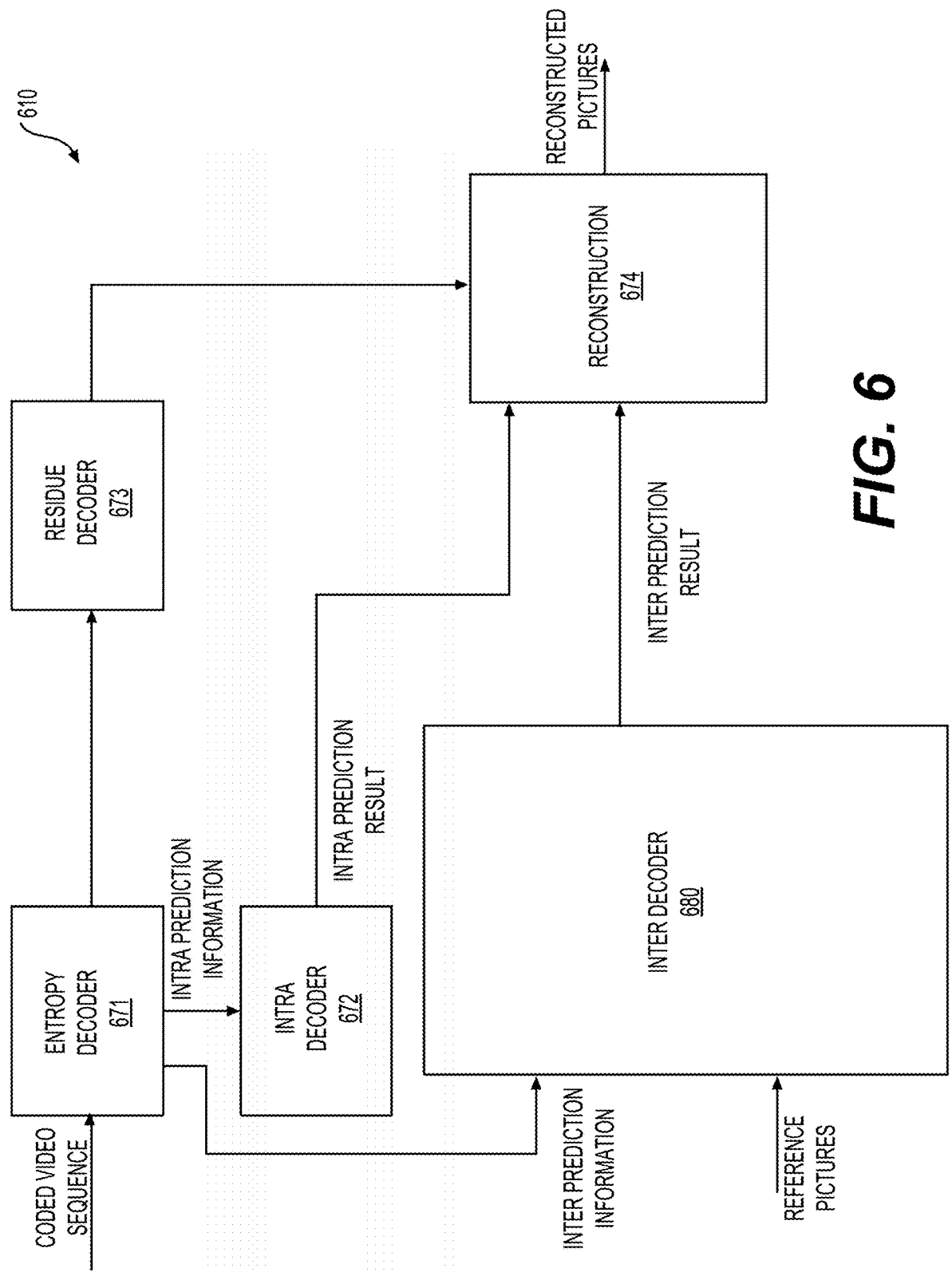
FIG. 6 shows a block diagram of a decoder in accordance with another embodiment.

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671) (data path not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (403), and the video decoders (210), (310), and (610) can be implemented using one or more processors that execute software instructions.

Aspects of the disclosure provide techniques for handling inter prediction tools when current picture is also used as a reference picture.

Figure 7:
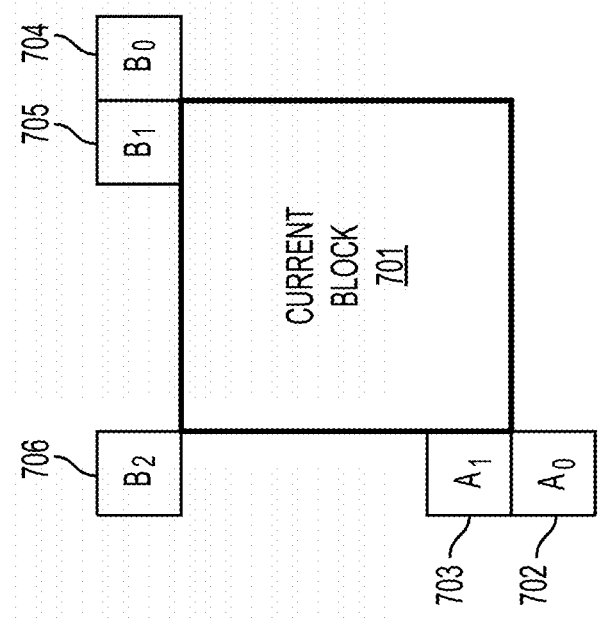
FIG. 7 shows a diagram for motion vector prediction based on neighboring blocks according to some embodiments of the disclosure.

Referring to FIG. 7, a current block (701) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (702 through 706, respectively). In some examples, the MV prediction can use predictors from the same reference picture that the neighboring block is using.

In some embodiments, a merge mode for inter-picture prediction is used. In an example, when a merge flag (including skip flag) is signaled as true, a merge index is then signaled to indicate which candidate in a merge candidate list is used to indicate the motion vectors of the current block. At decoder, a merge candidate list is constructed based on spatial and temporal neighbors of the current block. As shown in FIG. 7, neighboring MVs of A0, A1, and B0, B1, B2 can be added into the merge candidate list. In addition, an MV from temporal neighbors of the current block is added into the merge candidate list in an example. It is noted that additional merge candidates, such as combined bi-predictive candidates and zero motion vector candidates, and the like can be added into the merge candidate list.

In some examples, to construct a merge candidate list, before taking the motion information of a neighboring block as a merge candidate, a redundancy check is performed to check whether the motion information of the neighboring block is identical to an element in the current merge candidate list. When the merge information of the neighboring block is different from each element in the current merge candidate list, the motion information of the neighboring block can be added to the merge candidate list as a merge candidate. In some examples, MaxMergeCandsNum is defined as the size of merge list in terms of candidate number. In HEVC example, MaxMergeCandsNum is signaled in the coded video bitstream.

In some examples, the inter-picture prediction uses reference pictures other than the current picture. In some examples, the current picture can be the reference picture in a mode that is referred to as current picture referencing (CPR) mode. For example, a motion vector refers to the already reconstructed reference samples in the current picture. The CPR is sometimes referred to as intra block copy. In some examples, a CPR-coded CU is signaled as an inter coded block. The luma motion (or block) vector of a CPR-coded CU can be in integer precision. The chroma motion vector is clipped to integer precision as well. When combined with adaptive motion vector resolution (AMVR), the CPR mode can switch between 1-pel and 4-pel motion vector precisions. The current picture is placed at the end of the reference picture list L0. To reduce memory consumption and decoder complexity, the CPR allows only the reconstructed portion of the current CTU to be used in an example. This restriction allows the CPR mode to be implemented using local on-chip memory for hardware implementations in an example.

In some embodiments, at the encoder side, hash-based motion estimation is performed for CPR. In an example, the encoder performs rate distortion check for blocks with either width or height no larger than 16 luma samples. For non-merge mode, the block vector search is performed using hash-based search first. When the hash-based search does not return valid candidate, block matching based local search can be performed.

According to some examples, in the hash-based search, hash key matching (e.g., 32-bit cyclic redundancy check based matching) between the current block and a reference block is extended to all allowed block sizes. In some examples, the hash key calculation for every position in the current picture is based on 4×4 sub-blocks. For the current block of a larger size, hash keys of 4×4 sub-blocks are calculated. When all the hash keys of all 4×4 sub-blocks match the hash keys in the corresponding locations of the reference block, a hash key is determined to match the hash key of the reference block. When hash keys of multiple reference blocks are found to match the hash key of the current block, the block vector costs of each matched reference blocks are calculated according to suitable algorithm and the one with the minimum cost is selected.

According to some examples, in the block matching based local search, the search range is set to be N samples to the left and on top of the current block within the current CTU. In some examples, at the beginning of a CTU, the value of N is initialized to 128 when there is no temporal reference picture, and is initialized to 64 when there is at least one temporal reference picture. A hash hit ratio is defined as the percentage of samples in the CTU that found a match using hash-based search. While encoding the current CTU, when the hash hit ratio is below 5%, N is reduced by half.

Various tools are used in inter prediction, and some of the tools, such as merge mode with MV difference (MMVD), triangle partitions, intra-inter mode, affine merge prediction, and the like are not compatible with CPR.

In an example of a special merge mode, offsets to the merge candidates can be signaled. The special merge mode is referred to as merge mode with MV difference (MMVD). In MMVD, an offset (both magnitude and direction) on top of the existing merge candidates is signaled. In some examples, a few syntax elements are signaled to describe such an offset. For example, a prediction direction IDX (index), a base candidate IDX, a distance IDX, a search direction IDX, and the like, are signaled to describe such an offset. The prediction direction IDX is used to indicate which of the prediction directions (temporal prediction direction, e.g., L0 reference direction, L1 reference direction or L0 and L1 reference directions) is used for MMVD mode. The base candidate IDX is used to indicate which of the existing merge candidates is used as the start point (base candidate) to apply the offset. The distance IDX is used to indicate how large the offset is from the starting point (along x or y direction, but not both). The offset magnitude is chosen from a fix number of selections. The search direction IDX is used to indicate the direction (x or y, + or − direction) to apply the offset.

In an example, assuming the starting point MV is MV_S, the offset is MV_offset. Then the final MV predictor will be MV_final=MV_S+MV_offset.

Figure 8:
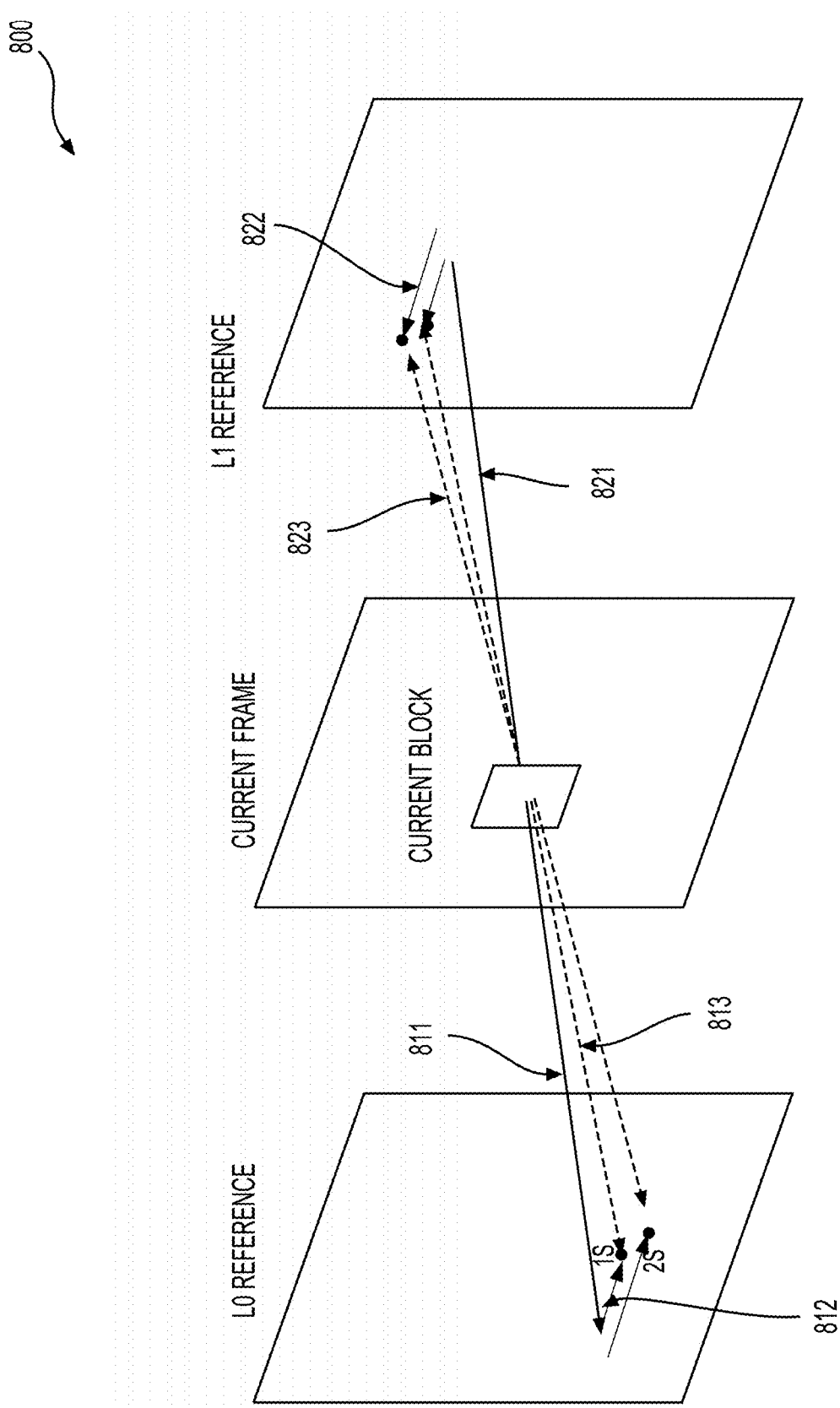
FIG. 8 shows examples for merge mode with motion vector difference (MMVD) according to an embodiment of the disclosure.

FIG. 8 shows examples for MMVD according to an embodiment of the disclosure. In an example, the starting point MV is shown by (811) (for example according to the prediction direction IDX and base candidate IDX), the offset is shown by (812) (for example according to the distance IDX and the search direction IDX), and the final MV predictor is shown by (813) in FIG. 8. In another example, the starting point MV is shown by (821) (for example according to the prediction direction IDX and base candidate IDX), the offset is shown by (822) (for example according to the distance IDX and the search direction IDX), and the final MV predictor is shown by (823) in FIG. 8.

FIG. 9 shows examples for MMVD according to an embodiment of the disclosure. For example, the starting point MV is shown by (911) (for example according to the prediction direction IDX and base candidate IDX). In the FIG. 9 example, 4 search directions, such as +Y, −Y, +X and −X, are used, and the four search directions can be indexed by 0, 1, 2, 3. The distance can be indexed by 0 (0 distance to the starting point MV), 1 (1s to the starting point MV), 2 (2s to the starting point MV), 3 (3s to the starting point), and the like. Thus, when the search direction IDX is 2, and the distance IDX is 2, the final MV predictor is shown as (915).

In another example, the search direction and the distance can be combined for indexing. For example, the starting point MV is shown by (921) (for example according to the prediction direction IDX and base candidate IDX). The search direction and the distance are combined to be indexed by 0-12 as shown in FIG. 9.

Triangular partition mode is another tool that is not compatible with CPR. The concept of the triangular prediction mode is to introduce a new triangular partition for motion compensated prediction.

Figure 10:
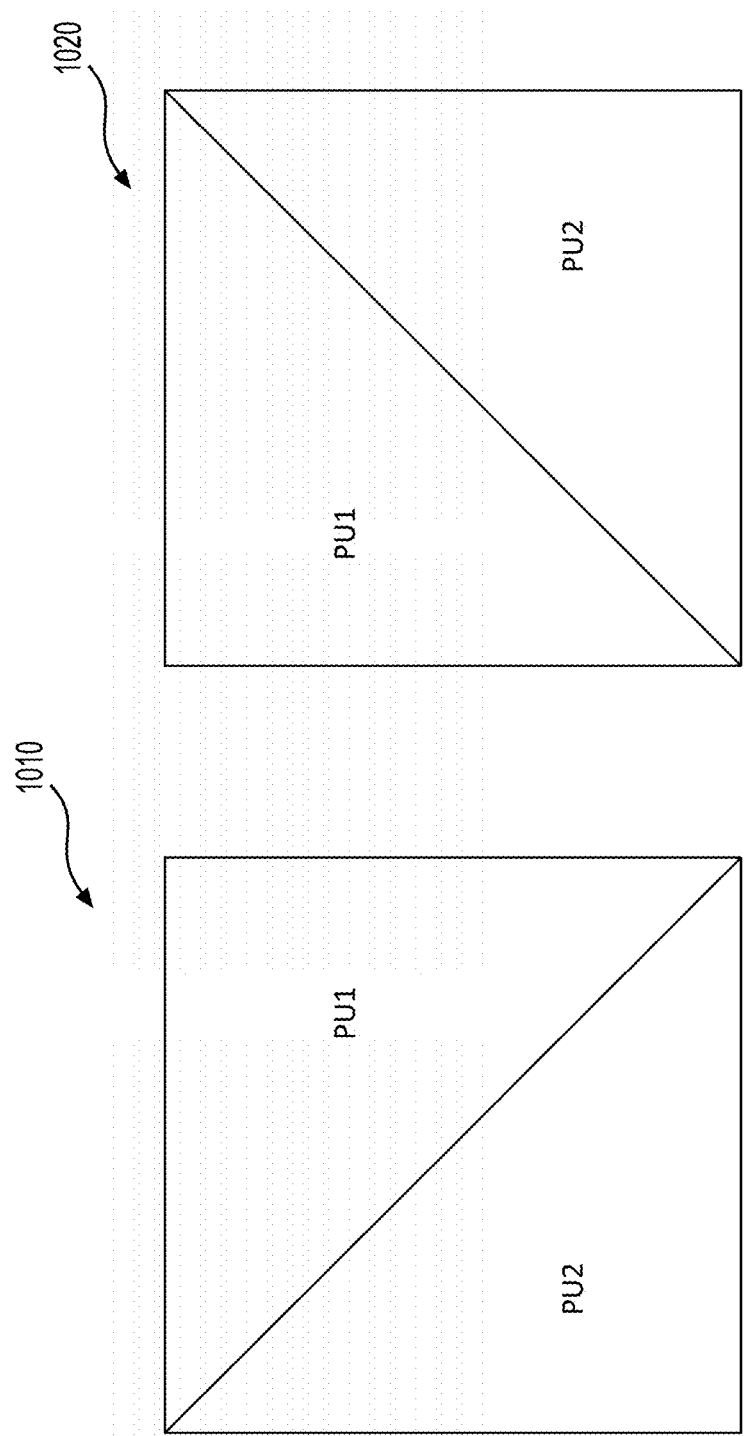
FIG. 10 shows two CU examples of triangular partition.

FIG. 10 shows two CU examples (1010) and (1020) of triangular partition. The CU (1010) is split from top-left corner to bottom-right corner (referred to as diagonal direction) into two triangular prediction units, and the CU (1020) is split from top-right corner to bottom-left corner (referred to as inverse diagonal direction) into two triangular prediction units PU1 and PU2. Each triangular prediction unit in the CU is inter-predicted using its own uni-prediction motion vector and reference frame index which are derived from a uni-prediction candidate list. Further, an adaptive weighting process is performed to the diagonal edge after predicting the triangular prediction units. Then, the transform and quantization process are applied to the whole CU. It is noted that the triangular partition is only applied to skip and merge modes.

Figure 11:
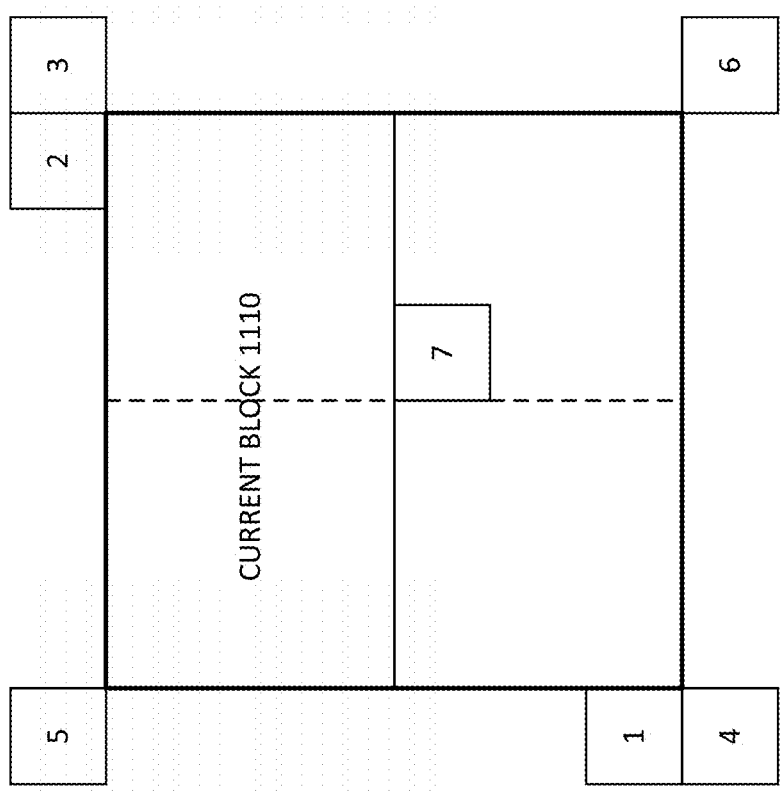
FIG. 11 shows an example for forming a uni-prediction candidate list for a current block.

FIG. 11 shows an example for forming a uni-prediction candidate list for a current block (1110). In an example, the uni-prediction candidate list consists of five uni-prediction motion vector candidates. The uni-prediction candidate list is derived from seven neighboring blocks including five spatial neighboring blocks (1 to 5 as shown in FIG. 11) and two temporal co-located blocks (6 to 7 as shown in FIG. 11). For example, the motion vectors of the seven neighboring blocks are collected and put into the uni-prediction candidate list in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. It is noted that in some examples, motion vectors for the neighboring blocks or the temporal co-located blocks are not available or are redundant, thus the number of candidate is less than five. Then, when the number of candidates is less than five, zero motion vector is added to the uni-prediction candidate list for the current block.

In some embodiments, based on the uni-prediction candidate list, inter prediction is performed respectively for each of the triangular prediction units. After predicting each triangular prediction unit, an adaptive weighting process is applied to the diagonal edge between the two triangular prediction units to derive the final prediction for the whole CU.

In an example, two weighting factor groups are used. The first weighting factor group includes {7/8, 6/8, 4/8, 2/8, 1/8} for luminance samples and {7/8, 4/8, 1/8} for the chrominance samples, respectively. The second weighting factor group includes {7/8, 6/8, 5/8, 4/8, 3/8, 2/8, 1/8} for the luminance samples and {6/8, 4/8, 2/8} for the chrominance samples, respectively.

In an example, one weighting factor group form the two weighting factor groups is selected based on the comparison of the motion vectors of two triangular prediction units. The second weighting factor group is used when the reference pictures of the two triangular prediction units are different from each other or the motion vector difference is larger than 16 pixels. Otherwise, the first weighting factor group is used.

Figure 12:
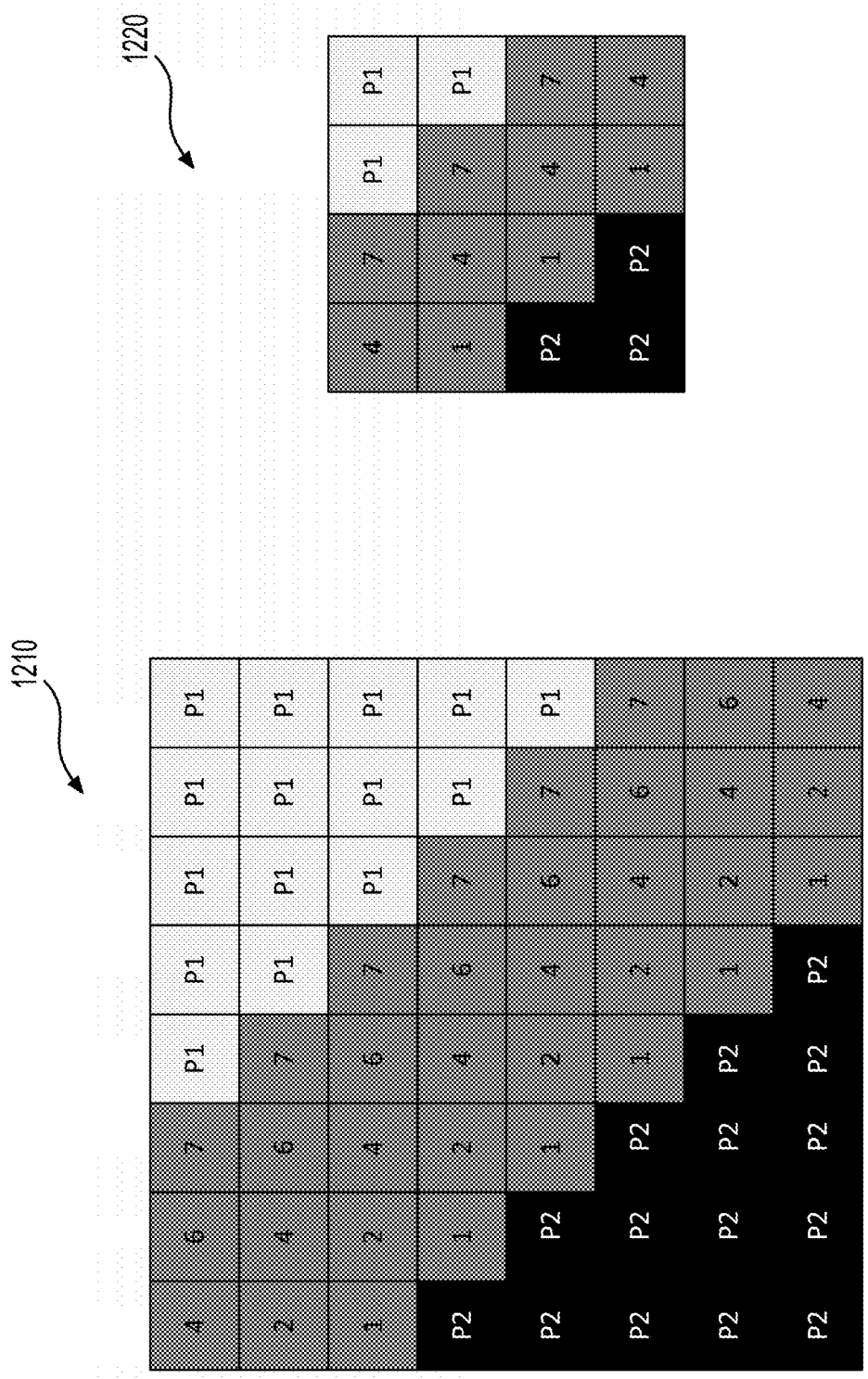
FIG. 12 shows an example of using the first weighting factor group to derive the final prediction for a coding unit according to some embodiment of the disclosure.

FIG. 12 shows an example of using the first weighting factor group to derive the final prediction for a CU according to some embodiment of the disclosure. FIG. 12 shows weighting factors (1210) for luminance samples and weighting factors (1220) for chrominance samples.

For example, for a luminance sample, P1 is the uni-prediction of PU1, P2 is the uni-prediction of PU2. In FIG. 12, when the weighting factor is shown as P1, the final prediction is solely determined by the uni-prediction of PU1; when the weighing factor is shown as P2, the final prediction is solely determined by the uni-prediction of PU2. When the weighing factor is shown as a number, the number is indicative of a weight for the uni-prediction of PU1. For example, when the weighting factor is 2, the final prediction is calculated according to Eq. 1; when the weighting factor is 4, the final prediction is calculated according to Eq. 2; and when the weighting factor is 7, the final prediction is calculated according to Eq. 3:

$$\text{Final Prediction} = \tfrac{2}{8} \times P1 + \tfrac{6}{8} \times P2 \qquad \text{Eq. 1}$$

$$\text{Final Prediction} = \tfrac{4}{8} \times P1 + \tfrac{4}{8} \times P2 \qquad \text{Eq. 2}$$

$$\text{Final Prediction} = \tfrac{7}{8} \times P1 + \tfrac{1}{8} \times P2 \qquad \text{Eq. 3}$$

In some embodiments, the motion vectors of the triangular prediction units are stored for each of 4×4 grids. For each 4×4 grid, either uni-prediction or bi-prediction motion vector is stored depending on the position of the 4×4 grid in the CU.

Figure 13:
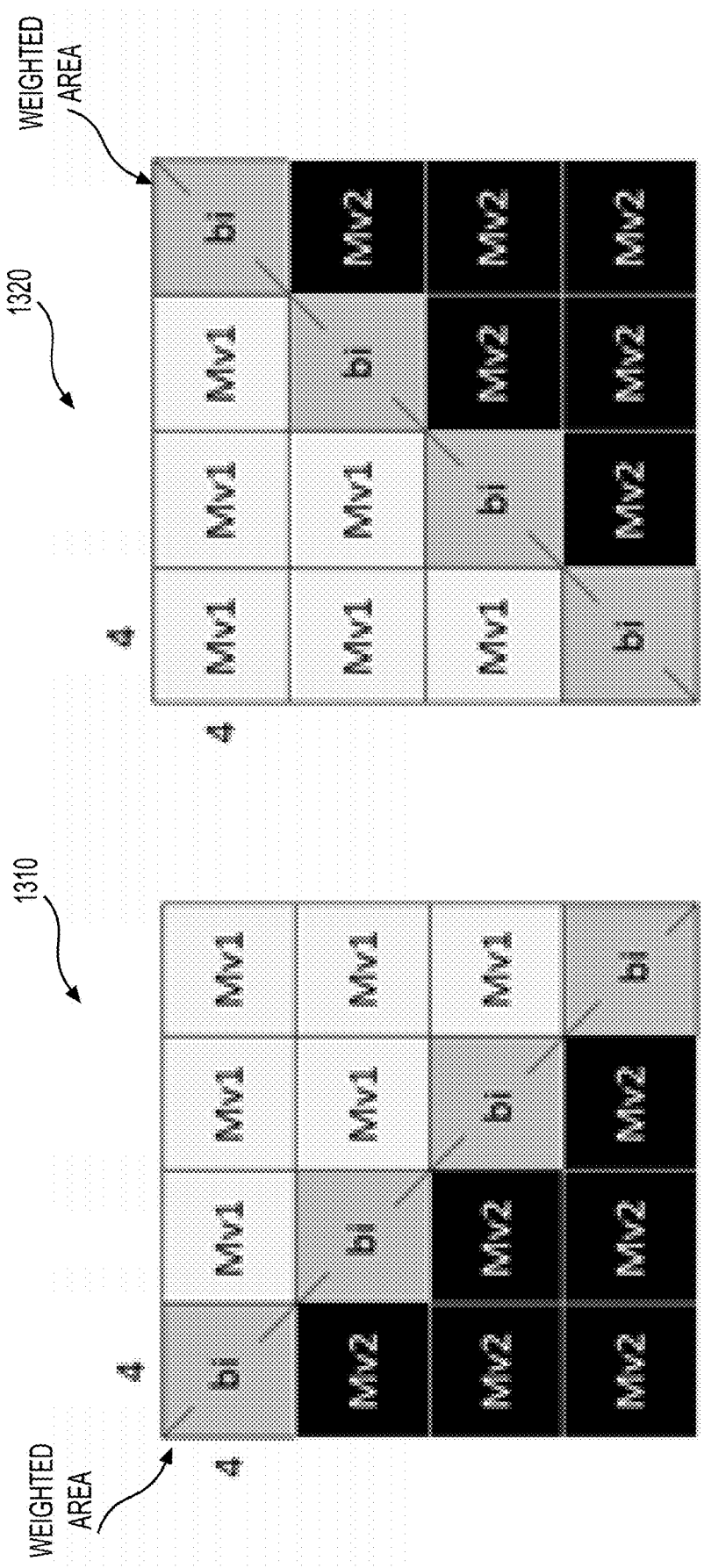
FIG. 13 shows examples to store motion vectors for triangular prediction according to some embodiments of the disclosure.

FIG. 13 shows examples (1310) and (1320) to store motion vectors for triangular prediction according to some embodiments of the disclosure. As shown in FIG. 13, uni-prediction motion vector, either Mv1 or Mv2, is stored for the 4×4 grid (small square in FIG. 13) located in the non-weighted area. On the other hand, a bi-prediction motion vector is stored for the 4×4 grid located in the weighted area. The bi-prediction motion vector is derived from Mv1 and Mv2 according to certain rules. In an example, when Mv1 and Mv2 are motion vectors from different directions (reference picture for one motion vector is from reference picture list L0 and reference picture for the other motion vector is from reference picture list L1), Mv1 and Mv2 are combined (e.g., average, weighted average, and the like) to form the bi-prediction motion vector.

In another example, both Mv1 and Mv2 are from the same L0 (or L1) direction, when the reference picture of Mv2 is the same as a picture in the L1 (or L0) reference picture list, Mv2 is scaled to that picture. Then, Mv1 and the scaled Mv2 are combined to form the bi-prediction motion vector.

In another example, both Mv1 and Mv2 are from the same L0 (or L1) direction, when the reference picture of Mv1 is the same as a picture in the L1 (or L0) reference picture list, Mv1 is scaled to that picture. The scaled Mv1 and Mv2 are combined to form the bi-prediction motion vector.

In another example, both Mv1 and Mv2 are from the same L0 (or L1) direction, none of the reference pictures in L1 is the same as the reference picture of Mv1 or Mv2, then one of Mv1 and Mv2, such as Mv1 is stored in the weighted area.

In some standards, the triangular prediction unit mode is only applied to CUs in skip or merge mode. Besides, the block size of the CUs cannot be smaller than 8×8. For a CU coded in a skip or merge mode, a CU level flag is signalled to indicate whether the triangular prediction unit mode is applied or not for the current CU. When the triangular prediction unit mode is applied to the CU, an index indicating the direction for splitting the CU into two triangular prediction units and the motion vectors of the two triangular prediction units are signalled. The index ranges from 0 to 39 (e.g., 2 directions×5 candidates for Mv1×4 candidate for Mv2). In some examples, a look-up table is used for deriving the splitting direction and motion vectors from the index.

Intra-inter mode is another tool that is not compatible with CPR. In some examples, the multi-hypothesis prediction is applied to improve intra mode, and multi-hypothesis prediction combines one intra prediction and one merge indexed prediction. In a merge mode CU, one flag is signaled for merge mode to select an intra mode from an intra candidate list when the flag is true.

In some examples, for luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is excluded from the intra mode list and when the CU height is larger than the double of CU width, vertical mode is excluded from the intra mode list. Then, an intra prediction is performed based on the intra prediction mode selected by the intra mode index and an inter prediction is performed based on the merge index, and a weighted average is calculated based on the intra prediction and the inter prediction as the result of the luma component. For chroma component, direct mode is applied without extra signaling in an example.

The weights for combining predictions are determined based on the modes and the sizes, shapes of the CBs. In an example, when DC or planar mode is selected or the CB width or height is smaller than 4, equal weights are applied. In another example, for a CB with CB width and height larger than or equal to 4, when horizontal/vertical mode is selected, the CB is first vertically/horizontally split into four equal-area sub-regions. Then, four weight sets are respectively used for the four equal-area sub-regions. For example, each of the weight sets can be denoted as (w_intrai, w_interi), where i is from 1 to 4. The first weight set (w_intra1, w_inter1) is set as (6, 2), the second weight set (w_intra2, w_inter2) is set as (5, 3), the third weight set (w_intra3, w_inter3) is set as (3, 5), and fourth weigth set (w_intra4, w_inter4) is set as (2, 6). The first weight set (w_intra1, w_inter1) is for the region closest to the reference samples and fourth weight set (w_intra4, w_inter4) is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring CUs.

Affine merge (AF_MERGE) mode is another tool that is not compatible with CPR. AF_MERGE mode can be applied for CUs with both width and height larger than or equal to 8. In the AF_MERGE mode, the control point motion vectors (CPMVs) of the current CU are generated based on the motion information of the spatial neighboring CUs. In some examples, the number of control point motion vector predictor (CPMVP) candidates can be up to five and an index is signalled to indicate the of the CPMVP candidates to be used for the current CU. In some embodiments, three types of CPMVP candidates are used to form the affine merge candidate list. The first type of CPMVP candidates can be inherited affine merge candidates that are extrapolated from the CPMVs of the neighbour CUs. The second type of CPMVP candidates can be constructed affine merge candidates CPMVPs that are derived using the translational MVs of the neighbour CUs. The third type of CPMVP candidates are zero MVs.

In some standards, such as VVC Test Model 3 (VTM3), there are maximum two inherited affine candidates, which are derived from affine motion model of the neighboring blocks, one from left neighboring CUs and one from above neighboring CUs. The candidate blocks can the blocks A0, A1, B0, B1 and B2 shown in FIG. 7. For the left predictor, the scan order is A0→A1, and for the above predictor, the scan order is B0→B1→B2. In an example, the first inherited candidate from each side is selected. No pruning check is performed between two inherited candidates. When a neighboring affine CU is identified, its control point motion vectors are used to derive the CPMVP candidate in the affine merge list of the current CU.

Figure 14:
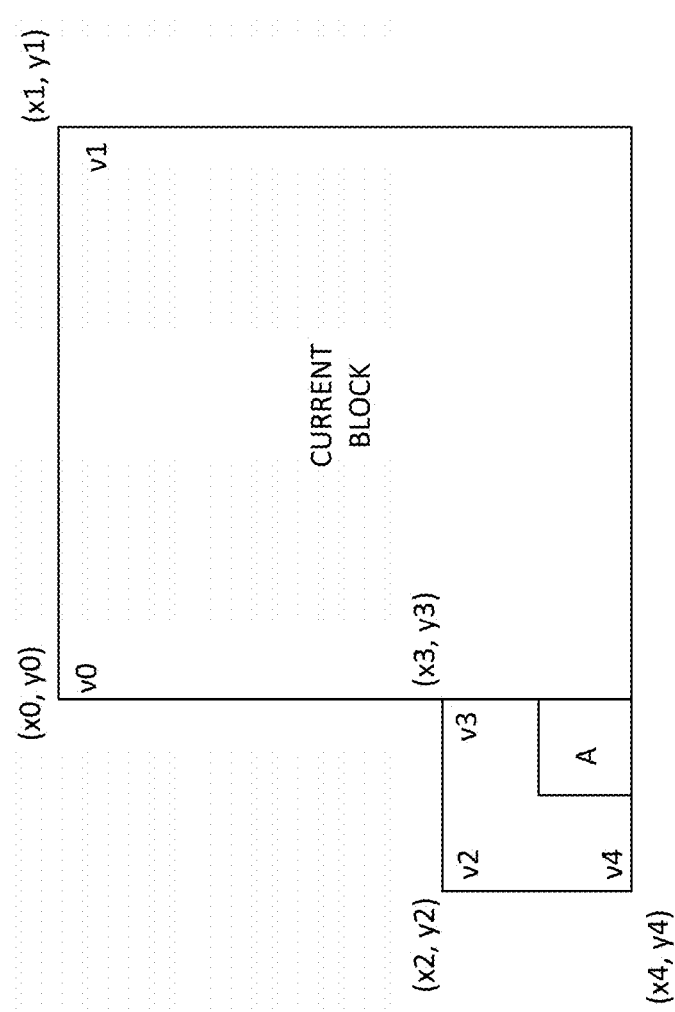
FIG. 14 shows an example for affine merge mode.

FIG. 14 shows an example for affine merge mode. As shown in FIG. 14, when the neighbour left bottom block A is coded in affine mode, the motion vectors $v_2$, $v_3$ and $v_4$ of the top left corner, above right corner and left bottom corner of a CU which contains the block A are attained. When block A is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

Figure 15:
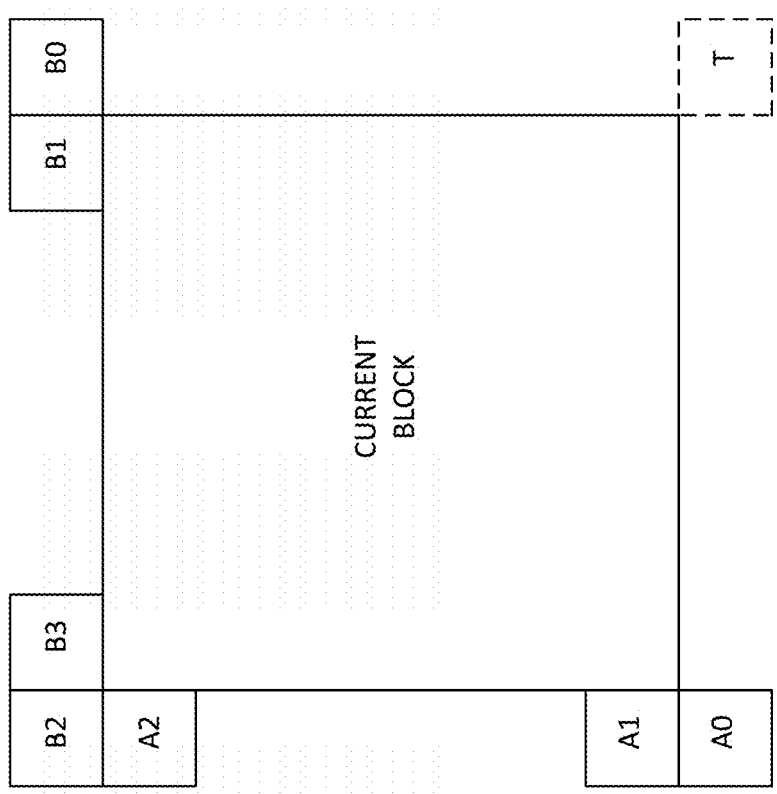
FIG. 15 shows an example of deriving motion information for the control points from the specified spatial neighbors and temporal neighbor.

In an example, constructed affine candidate is a candidate that is constructed by combining the neighbor translational motion information of each control point. The motion information for the control points is derived from the specified spatial neighbors and temporal neighbor shown in FIG. 15. $CPMV_k$ (k=1, 2, 3, 4) can be used to represent the k-th control point. For $CPMV_1$, in an example, neighboring blocks B2, B3 and A2 are checked in an order of B2→B3→A2 and the MV of the first available block is used. For $CPMV_2$, in an example, neighboring blocks B1 and B0 are checked in an order of B1→B0 blocks, and the MV of the first available block is used. For $CPMV_3$, in an example, neighboring blocks A1 and A0 are checked in an order of A1→A0, and the MV of the first available block is used. In an example, TMVP is used as $CPMV_4$ when temporal motion vector prediction (shown as T in FIG. 15) is available.

In some examples, after the motion information (motion vectors) of four control points are attained, affine merge candidates are constructed based on the motion information. In an example, the motion information of the control points is suitably combined and used in an order to construct affine merge candidates. For example, the order is $\{CPMV_1, CPMV_2, CPMV_3\}$, $\{CPMV_1, CPMV_2, CPMV_4\}$, $\{CPMV_1, CPMV_3, CPMV_4\}$, $\{CPMV_2, CPMV_3, CPMV_4\}$, $\{CPMV_1, CPMV_2\}$, $\{CPMV_1, CPMV_3\}$. The combination of 3 CPMVs constructs a 6-parameter affine merge candidate and the combination of 2 CPMVs constructs a 4-parameter affine merge candidate. To avoid motion scaling process, when the reference indices of control points are different, the related combination of control point MVs is discarded.

According to some aspects of the disclosure, in some software implementation and specifications (e.g., a current version of VTM software or VVC specification), the above mentioned inter coding tools, such as MMVD, triangle partitions and intra-inter mode, are considered as some special merge modes. To apply these modes, a usage flag under merge mode is signaled for each of these modes. The inter prediction block in one of these modes is generated based on a motion vector that is determined based on a signaled merge index (or a pair of motion vectors in bi-prediction).

According to some aspects, block based compensation can be used for inter prediction and intra prediction. In the present disclosure, the concept of block is inter-changeable with coding unit (CU), and is different from sub-block. For the inter prediction, block based compensation from a different picture is known as motion compensation. For intra prediction, block based compensation can also be done from a previously reconstructed area within the same picture. The block based compensation from reconstructed area within the same picture is referred to as intra picture block compensation, intra block copy, or CPR. A displacement vector that indicates the offset between the current block and the reference block in the same picture is referred to as a block vector (or BV for short). Different from a motion vector in motion compensation, which can be at any value (positive or negative, at either x or y direction), a block vector has a few constraints to ensure that the reference block is available and already reconstructed. Also, in some examples, for parallel processing consideration, some reference area that is tile boundary or wavefront ladder shape boundary is excluded.

The coding of a block vector could be either explicit or implicit. In the explicit mode, the difference between a block vector and its predictor is signaled; in the implicit mode, the block vector is recovered from a predictor (referred to as block vector predictor), in a similar way as a motion vector in merge mode. The resolution of a block vector, in some implementations, is restricted to integer positions; in other systems, the block vector is allowed to point to fractional positions.

In some examples, the use of intra block copy at block level, can be signaled using a reference index approach. The current picture under decoding is then treated as a reference picture. In an example, such a reference picture is put in the last position of a list of reference pictures. This special reference picture is also managed together with other temporal reference pictures in a buffer, such as decoded picture buffer (DPB).

There are also some variations for intra block copy, such as flipped intra block copy (the reference block is flipped horizontally or vertically before used to predict current block), or line based intra block copy (each compensation unit inside an M×N coding block is an M×1 or 1×N line).

Figure 16:
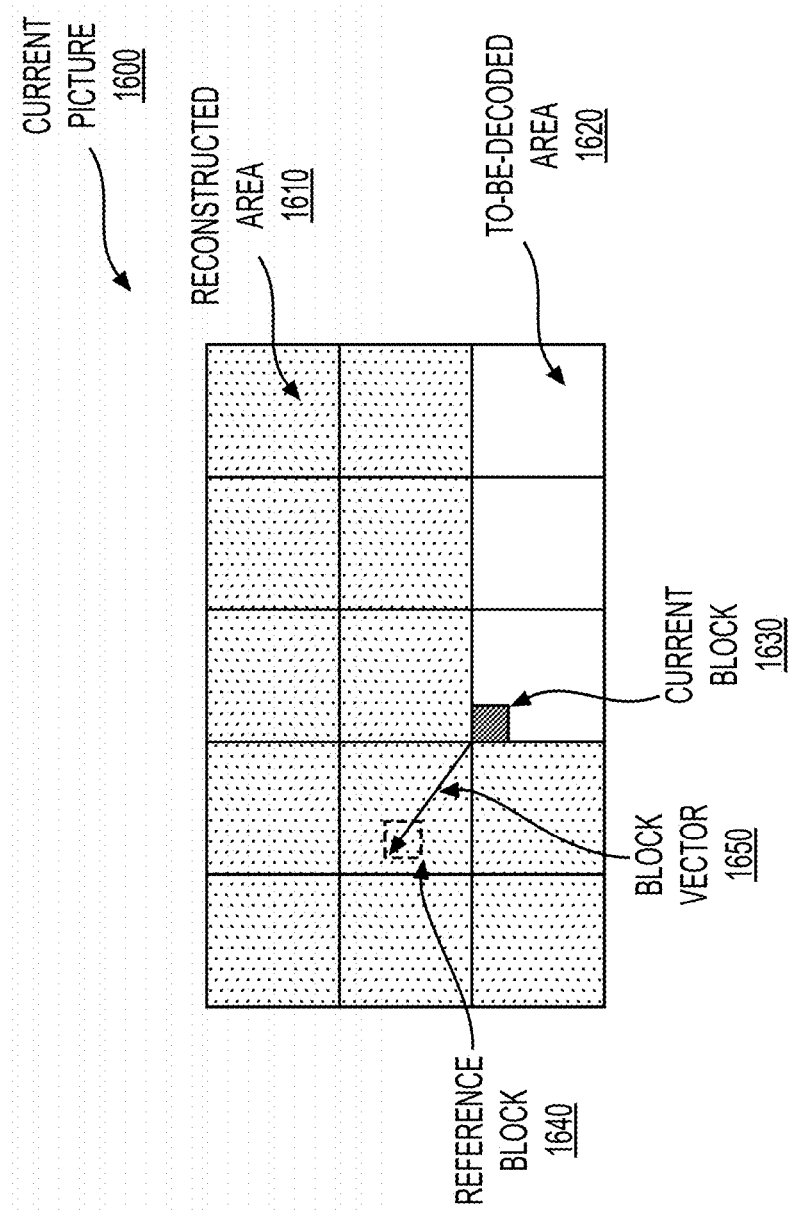
FIG. 16 shows an example of intra block copy according to an embodiment of the disclosure.

FIG. 16 shows an example of intra block copy according to an embodiment of the disclosure. Current picture (1600) is under decoding. The current picture (1600) includes a reconstructed area (1610) (dotted area) and to-be-decoded area (1620) (white area). A current block (1630) is under reconstruction by a decoder. The current block (1630) can be reconstructed from a reference block (1640) that is in the reconstructed area (1610). The position offset between the reference block (1640) and the current block (1630) is referred to as a block vector (1650) (or BV (1650)).

When motion compensation is performed at block level, that is, the current block is the processing unit for performing motion compensation using the same motion information. Given the size of a block, all pixels in the block will use the same motion information to form the prediction block.

It is noted that, in some encoding/decoding examples, pixels at different positions inside a motion compensation block can have some different motion information. In some examples, such differences from the block level motion information are derived, instead of signaled. The motion compensation that allows the actual basic unit of motion compensation of a block to be smaller than the block itself is referred to as sub-block level motion compensation. In other words, each block will have potentially multiple sub-blocks, each of which may content different motion information.

Examples of sub-block level motion compensation include sub-block based temporal motion vector prediction, spatial/temporal fusion with sub-block adjustment, affine coded motion compensation block, merge candidate refinement using decoder side motion vector derivation and the like.

For the sub-block based temporal motion vector prediction, sub-blocks of a current block may have different motion vector predictors, which are all derived from a temporal reference picture. For example, in the first step, a set of motion information, including motion vector and the reference index for the current block is identified. For example, the motion information from the first available merge candidate from candidates A0, B0, B1, A1 in FIG. 7. Using this motion information, the current block determines a reference block in a reference picture, for example, the collocated reference picture. The reference block is also divided into sub-blocks, in the same way as the current block does. Then for each sub-block in the current block, the corresponding reference sub-block in the said reference block is determined in the first step.

In the second step, for each sub-block in the current block, when its reference sub-block is coded in inter mode with a set of motion information, then that motion information will be converted (using methods such as motion vector scaling in temporal motion vector prediction, etc.) and used as a predictor for the motion vector of this sub-block. When the reference sub-block is coded in intra mode, then the default setting in this mode (e.g., zero motion vector) will be used as a predictor for the current sub-block.

In an example of join exploration model (JEM), advanced temporal motion vector prediction (ATMVP) can be used. ATMVP allows each CU to fetch multiple sets of motion information from multiple blocks smaller than the current CU in the collocated reference picture.

For, spatial/temporal fusion with sub-block adjustment, a coding block is divided into sub-blocks. For each sub-block, the motion vector of the sub-block is adjusted according to spatial/temporal neighbors' motion vectors of the sub-block. In the mode of spatial/temporal fusion with sub-block adjustment, for some sub-blocks, it may need the motion information from its corresponding sub-block in a temporal reference picture. In JEM, this method is referred to as spatial-temporal motion vector prediction (STMVP)

For, affine coded motion compensation block, according to neighboring blocks' motion vectors, the motion vectors of current block at its four corners are derived first. Then the rest of the block's motion vectors, at sub-block or even pixel level, are then derived using an affine model. So, each sub-block can have a different motion vector as compared to its neighbors.

For merge candidate refinement using decoder side motion vector derivation, after getting the motion vector predictor(s) for the current block or its sub-blocks, methods such as template matching, bilateral matching can be used to further refine the given motion vector predictor(s). The refined motion vector(s) will be used to perform motion compensation. The same refinement operation will be performed at both encoder and decoder sides so that no additional information is needed by the decoder as how the refinement is displaced from the original predictor.

It is noted that skip mode can be considered as a special merge mode, where in addition to deriving motion information of current block from its neighbors, the prediction residue of current block is also zero.

According to an aspect of the disclosure, sub-block based temporal motion vector prediction mode, such as ATMVP or STMVP, requires the corresponding sub-block is coded in inter mode. There are no apparent solutions to efficiently use such a mode when intra block copy mode is also used.

According to another aspect of the disclosure, when current picture is used as a reference picture, a merge candidate can also be coded in CPR mode. In some implementations, CPR and these modes cannot be combined together. In other words, when one of these inter modes (such as affine mode, MMVD, triangle partition and intra-inter mode) is used, the reference picture cannot be the current picture itself. Therefore, when a motion vector indicated by a merge candidate points to the current picture itself (CPR mode), this candidate is not allowed to be used to generate inter prediction block in these inter merge modes (such as affine mode, MMVD, triangle partition and intra-inter mode). Certain constraints are therefore needed to make sure the interaction between CPR mode and other inter mode will work properly.

Aspects of the disclosure provide techniques to make sure that the interaction between CPR mode (intra block copy) and the other inter modes can operate properly.

The proposed methods may be used separately or combined in any order. Further, the proposed methods may be implemented by processing circuitry (e.g., one or more processors or one or more integrated circuits). In one example, the one or more processors execute a program that is stored in a non-transitory computer-readable medium.

According to some aspects of the disclosure, the disclosed methods can impose several bitstream conformance requirements on some inter coding tools, when current picture referencing (or intra block copy) is also used. Examples of inter modes in this disclosure are affine mode, MMVD, triangle partitions and intra-inter mode. For convenience, these inter coding tools are called non-CPR compatible inter coding tools (NCC inter coding tools). The proposed methods can be applied to other inter coding modes that are not compatible with the CPR when the current picture is used as a reference picture.

In the following, the term block may be interpreted as a prediction block, a coding block, or a coding unit, i.e. CU.

In some embodiments, for each NCC inter coding tool, an explicit conformance bitstream requirement is imposed such that when this tool is used for coding the current block, the reference picture cannot be the current picture itself.

Specifically, in an example, the encoder checks whether the reference picture of a current block in a current picture is the current picture itself for an inter prediction. When the reference picture is the current picture, then the NCC inter coding tools cannot be used to encode the current block. At the decoder side, the decoder can determine whether the coded video bitstream is valid based on a conformance check of the usage information of the NCC inter coding tools to the reference picture for the current block.

In some embodiments, for each NCC inter coding tool, when the motion vector derivation process for this inter coding tool has already excluded motion vector candidates pointing to the current picture itself, an explicit conformance bitstream requirement is imposed such that when all the motion vector candidates for this coding block are block vectors (pointing to the current picture), the usage flag for this coding tool in this coding block shall be equal to false (does not apply).

For example, an NCC inter coding tool can use a derivation process for determining a motion vector for the current block from motion vector candidates. The derivation process excludes any motion vector candidates with the current picture being the reference picture. Then when all the motion vector candidates for the current block use the current picture as the reference picture, then the NCC inter coding tool should not be used by the encoder. Thus, at the decoder side, the decoder can perform a conformance test. When the usage information indicates that the NCC inter coding tool has been used, and all motion vector candidates for the current block use the current picture as the reference picture, the decoder can determine that the coded video bitstream is invalid.

In an embodiment, when the current picture is the only reference picture for a coding block in a slice/tile/picture, any motion vector prediction candidate will produce block vector candidates only. In this situation, the usage flags for NCC inter coding tools such as Affine mode, MMVD, triangle partitions and intra inter mode, shall be set equal to false for each coding block.

In an example, when the reference picture list includes only the current picture, then the motion vector prediction candidates can only generate block vector candidates. Thus, the NCC inter coding tools, such as Affine mode, MMVD, triangle partitions and intra inter mode, thus the usage flags for those NCC inter coding tools should be set to false at the encoder side. In an example, the usage flags are included in the coded video bitstream. In some situations, the usage flags are changed by an attacker for example. At the decoder side, the decoder can perform a conformance test. When the usage flag of an NCC inter coding tool is true, and the reference picture list includes only the current picture, the decoder can determine that the coded video bitstream is invalid, and suitable actions can be taken.

In another embodiment, when the current picture is the only reference picture for a coding block in a slice/tile/picture, the usage flags for NCC inter coding tools such as Affine mode, MMVD, triangle partitions and intra inter mode, shall be inferred as false, without signaling.

In an example, when the current picture is the only reference picture for a coding block, the encoder does not need to include the usage flags for the NCC inter coding tools in the coded video bitstream. The decoder can infer the usage flags to be false when the current picture is the only reference picture for the coding block.

In some embodiments, for each NCC inter coding tool, when all the motion vector candidates for this coding block are block vectors (pointing to the current picture), a default motion vector (pointing to a default temporal reference picture, if exists) shall be available in the list and is used to generate an inter prediction block for the current coding block. When there are more than one merge index that can be used for selecting a motion vector from multiple candidates, default motion vectors pointing to different reference pictures in the reference picture list(s) in a circular way (such as the zero merge candidates in HEVC merge, pointing to a first reference picture indicated by ref idx 0, a second reference picture indicated by ref idx 1, etc., in the reference picture list) will be used. In some examples, the default motion vector can be zero motion vector.

In some examples, to generate motion vectors in merger list construction, when zero motion vector is used, the current picture is excluded from being reference picture.

Also in the present disclosure, several methods are provided to utilize sub-block based temporal motion vector prediction when intra block copy mode is also used. The sub-block based temporal motion vector prediction includes but not limits to ATMVP and STMVP.

The motion vector prediction can be in merge mode or MV prediction with MV difference signaled (AMVP mode). In the present disclosure, terms of block, whole block, prediction unit, coding unit are inter-exchangeable.

When sub-block based temporal motion vector prediction mode is used, the first step is to find a reference block from the given reference picture (such as the collocated picture) for the current whole block.

In some embodiments, intra block copy block vector information is included as part of motion vector prediction candidates for finding the reference block for ATMVP mode. In these embodiments, when sub-block based temporal motion vector prediction mode is used, the current whole block (coding unit) will find its reference block through a motion vector from a list of motion vector predictor candidates, such as from the merge candidate list.

In some examples, intra block copy mode is considered as part of inter mode, then the current picture itself is regarded as a reference picture for example. Some of the merge candidates, such as those at A0, B0, B1, A1 positions in FIG. 7, can be coded in intra block copy mode. When the motion information from an intra block copy coded merge candidate is checked for finding the ATMVP coding unit's reference block in the reference picture, the block vector of this merge candidate can be used, without scaling to the designated reference picture for ATMVP mode. After finding the reference block using this block vector, the reference block will be split into sub-blocks in the same way as those sub-blocks in ATMVP coding unit, and then each sub-block's motion vector will be derived from its corresponding sub-block in the reference block.

In an example, in the ATMVP mode, one of the reference pictures is selected as a collocated reference picture that is a designated reference picture for ATMVP mode. Generally, when a merge candidate is available, the motion vector of the merge candidate is scaled based on the reference picture of the merge candidate and the designated reference picture (e.g., collocated reference picture) to find a reference block in the designated reference picture. In the case of the merge candidate being block vector, the block vector is not scaled and is used directly to find the reference block in the designated reference picture.

In some examples, intra block copy mode is considered as a third mode other than intra mode or inter mode, but the merge list is still shared by regular inter coded candidates and intra block copy coded candidates. Similarly, some of the merge candidates, such as those at A0, B0, B1, A1 positions in FIG. 7, can be coded in intra block copy mode. When the motion information from an intra block copy coded merge candidate is checked for finding the ATMVP coding unit's reference block in the reference picture, the block vector of this merge candidate can be used, without scaling to the designated reference picture for ATMVP mode. After finding the reference block using this block vector, the reference block will be split into sub-blocks in the same way as those sub-blocks in ATMVP coding unit, and then each sub-block's motion vector will be derived from its corresponding sub-block in the reference block.

In some embodiments, intra block copy block vector information is excluded from being a part of motion vector prediction candidates for finding the reference block for ATMVP mode.

In an embodiment, when sub-block based temporal motion vector prediction mode is used, the current whole block (coding unit) will find its reference block through a motion vector from a list of motion vector predictor candidates, such as from the merge candidate list.

In some examples, intra block copy mode is considered as part of inter mode (for example, the current picture itself is regarded as a reference picture). Some of the merge candidates, such as those at A0, B0, B1, A1 positions in FIG. 7, can be coded in intra block copy mode. When the motion information from an intra block copy coded merge candidate is checked for finding the ATMVP coding unit's reference block in the reference picture, this merge candidate cannot be used. The merge candidate that is intra block copy coded is considered as not available or does not have valid motion information (same way as coded in intra mode).

In some examples, intra block copy mode is considered as a third mode other than intra mode or inter mode, but the merge list is still shared by regular inter coded candidates and intra block copy coded candidates. Some of the merge candidates, such as those at A0, B0, B1, A1 positions in FIG.

7, can be coded in intra block copy mode. When the motion information from an intra block copy coded merge candidate is checked for finding the ATMVP coding unit's reference block in the reference picture, this merge candidate cannot be used. The merge candidate that is intra block copy coded is considered as not available or does not have valid motion information (same way as coded in intra mode).

Specifically, in an example, merger candidates at positions A0, B0, B1 and A1 are checked in an order. To check a merge candidate, when the reference picture of the merge candidate is the current picture, the merge candidate is considered as not available, and then the next merge candidate in the order is checked.

Figure 17:
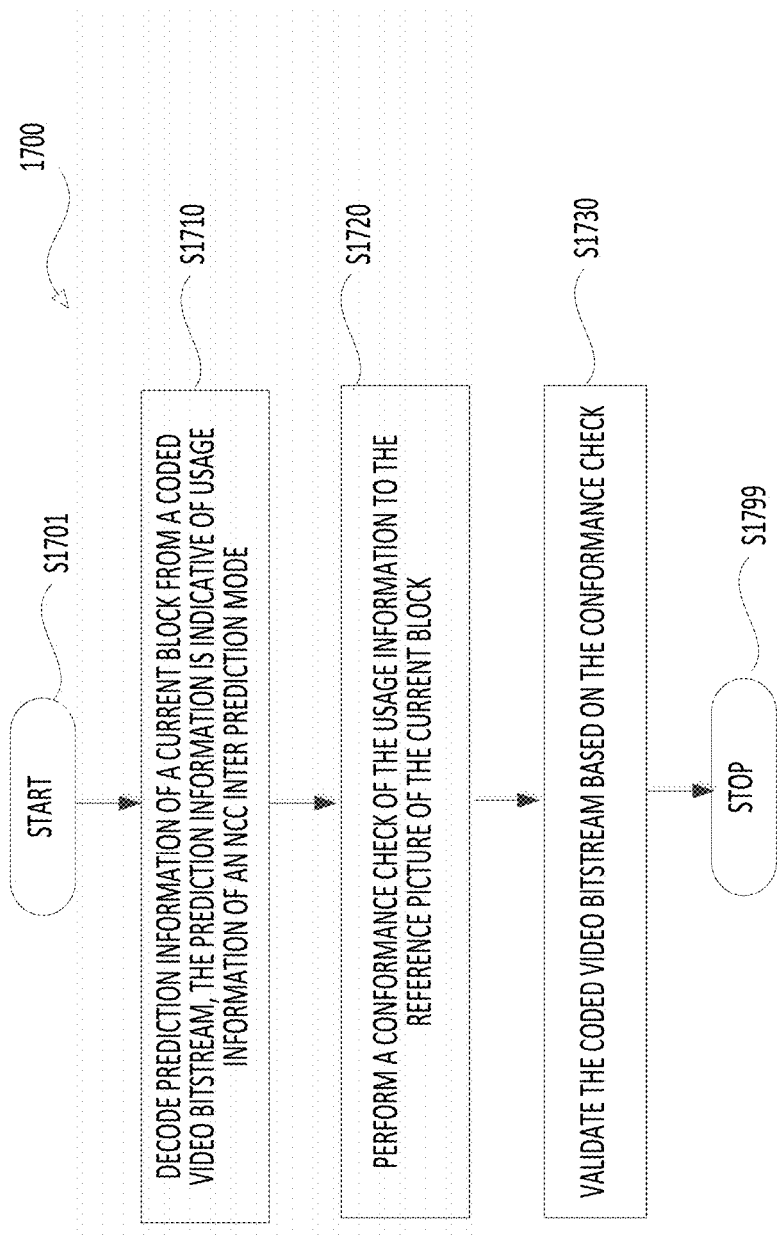
FIG. 17 shows a flow chart outlining a process example according to some embodiments of the disclosure.

FIG. 17 shows a flow chart outlining a process (1700) according to an embodiment of the disclosure. The process (1700) can be used in the reconstruction of a block coded in intra mode, so to generate a prediction block for the block under reconstruction. In various embodiments, the process (1700) are executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), and the like. In some embodiments, the process (1700) is implemented in software instructions, thus when the processing circuitry executes the software instructions, the processing circuitry performs the process (1700). The process starts at (S1701) and proceeds to (S1710).

At (S1710), prediction information of a current block is decoded from a coded video bitstream. The prediction information is indicative of usage information of an NCC inter prediction mode. In an example, the prediction information is indicative of a usage flag for the NCC inter prediction mode. For example, when the usage flag is true, the NCC inter prediction mode is used in the prediction of the current block, and when the usage flag is false, the NCC inter prediction mode is not used in the prediction of the current block.

At (S1720), a conformance check is performed on the usage information and the reference picture of the current block. For example, when the reference picture of the current block is the current picture, then the NCC inter prediction mode should not be used in the prediction of the current block. Then, when the usage flag is false, the usage flag conforms with situation that the reference picture is the current picture. However, when the usage flag is true, the usage flag does not conform to the situation that the reference picture is the current picture.

At (S1730), the coded video bitstream can be validated based on the conformance check. In an example, when the usage information does not conform to the situation that the reference picture is the current picture, the coded video bitstream is invalid, and suitable actions can be taken. When the usage information conforms to the situation that the reference picture is the current picture, other suitable conformance checks (e.g., conformance checks on usage information of other NCC inter prediction modes and the like) may be further performed to validate the coded video bitstream. Then, the process proceeds to (S1799), and terminates.

Figure 18:
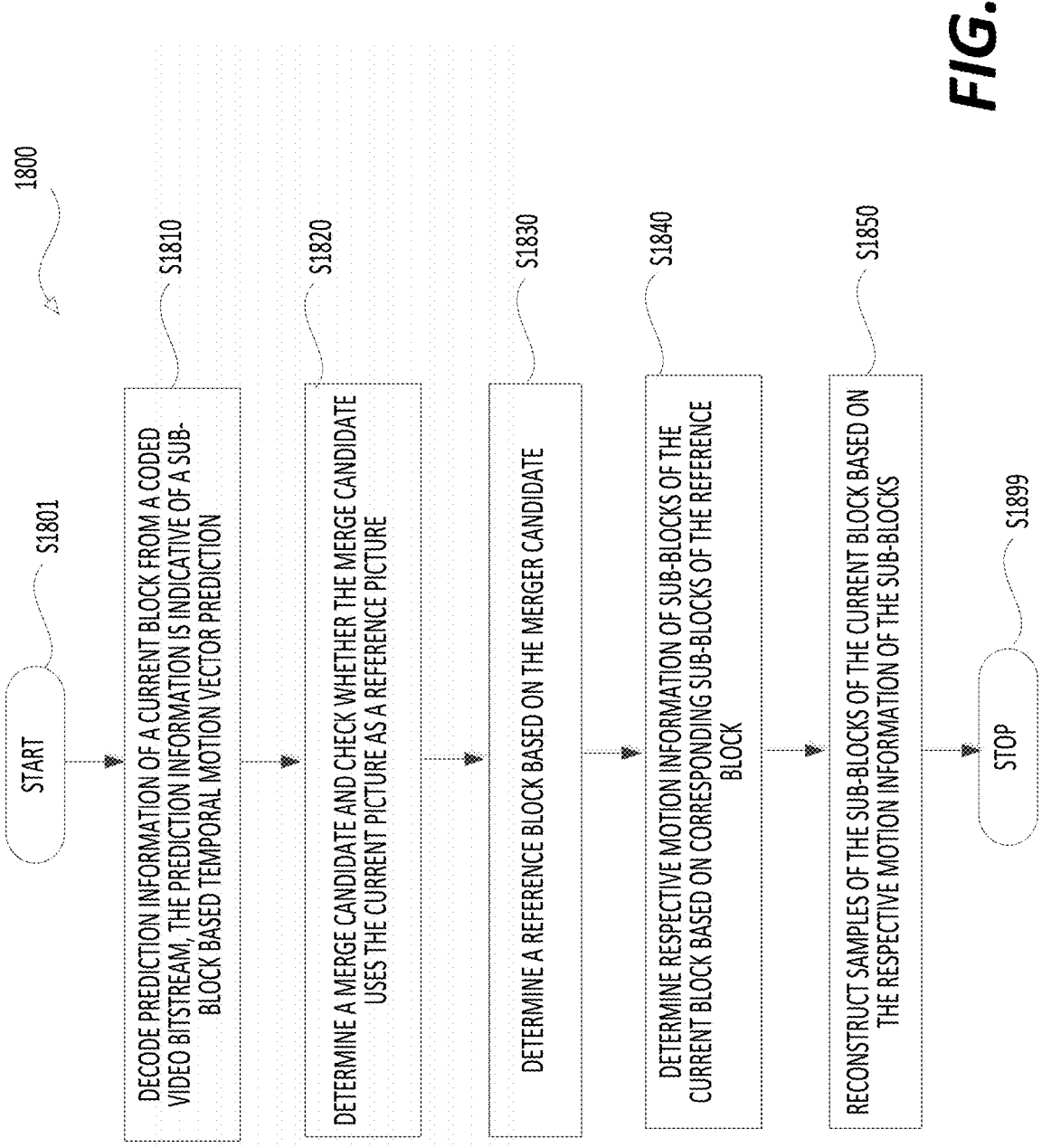
FIG. 18 shows a flow chart outlining another process example according to some embodiments of the disclosure.

FIG. 18 shows a flow chart outlining a process (1800) according to an embodiment of the disclosure. The process (1800) can be used in the reconstruction of a block coded in intra mode, so to generate a prediction block for the block under reconstruction. In various embodiments, the process (1800) are executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), and the like. In some embodiments, the process (1800) is implemented in software instructions, thus when the processing circuitry executes the software instructions, the processing circuitry performs the process (1800). The process starts at (S1801) and proceeds to (S1810).

At (S1810), prediction information of a current block is decoded from a coded video bitstream. The prediction information is indicative of a sub-block based temporal motion vector prediction.

At (S1820), a merge candidate is checked to determine whether the merge candidate uses the current picture as the reference picture. For example, some of the merge candidates, such as those at A0, B0, B1, A1 positions in FIG. 7, can be checked in an order.

In some embodiments, intra block copy block vector can be included as part of the motion vector prediction candidates for finding the reference block for ATMVP mode. In such embodiments, a merge candidate is still considered as available when the current picture is the reference picture. In some embodiments, the block vector of the merge candidate can be used, without scaling to the designated reference picture for ATMVP mode.

In some embodiments, intra block copy block vector is excluded from being motion vector candidates for finding the reference block for ATMVP mode. In such embodiments, when the merge candidate uses the current picture as the reference picture, the merge candidate is considered as not available or does not have valid motion information (e.g., same as coded in intra mode). Then, the next motion vector is checked until a valid motion vector candidate is found.

At (S1830), a reference block is determined based on the checking. In some embodiments, intra block copy block vector can be included as part of the motion vector prediction candidates for finding the reference block for ATMVP mode. In the case of the merge candidate being block vector, the block vector is not scaled and is used directly to find the reference block in the designated reference picture.

In some embodiments, intra block copy block vector is excluded from being motion vector candidates for finding the reference block for ATMVP mode. Then, the motion vector of the merge candidate is scaled based on the reference picture of the merge candidate and the designated reference picture (e.g., collocated reference picture) to find a reference block in the designated reference picture.

At (S1840), respective motion information of sub-blocks of the current block is determined based on corresponding sub-blocks of the reference block.

At (S1850), samples of the sub-blocks of the current block are reconstructed based on the respective motion information of the sub-blocks of the current block. Then, the process proceeds to (S1899), and terminates.

The techniques described above, can be implemented as computer software using computer-readable instructions and physically stored in one or more computer-readable media. For example, FIG. 19 shows a computer system (1900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 19:
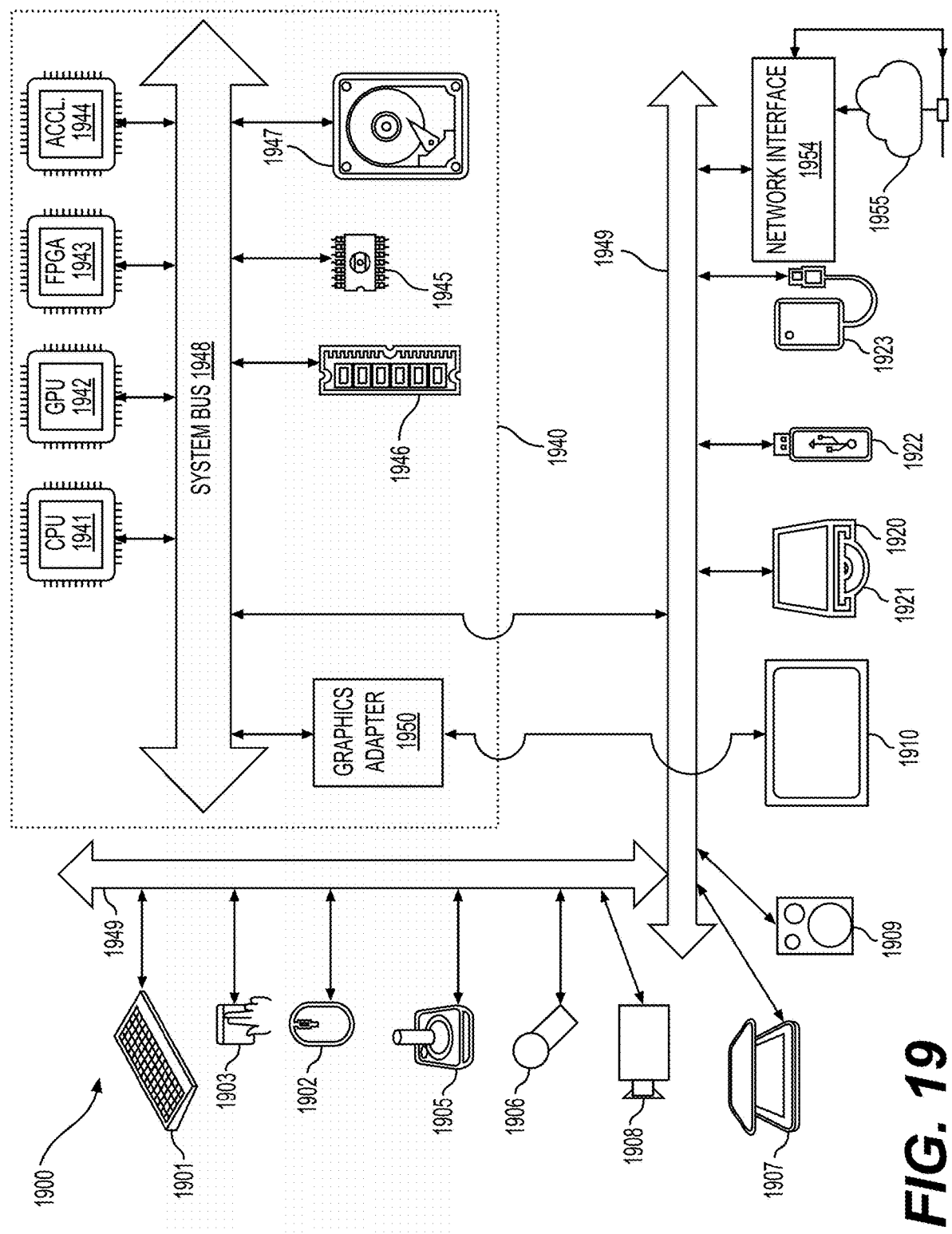
FIG. 19 is a schematic illustration of a computer system in accordance with an embodiment.

The components shown in FIG. 19 for computer system (1900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1900).

Computer system (1900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1901), mouse (1902), trackpad (1903), touch screen (1910), data-glove (not shown), joystick (1905), microphone (1906), scanner (1907), camera (1908).

Computer system (1900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1910), data-glove (not shown), or joystick (1905), but there can also be tactile feedback devices that do not serve as input devices), audio output devices (such as: speakers (1909), headphones (not depicted)), visual output devices (such as screens (1910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1900) can also include human accessible storage devices and their associated media such as optical media including CD/DVD ROM/RW (1920) with CD/DVD or the like media (1921), thumb-drive (1922), removable hard drive or solid state drive (1923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1900) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1949) (such as, for example USB ports of the computer system (1900)); others are commonly integrated into the core of the computer system (1900) by attachment to a system bus as described below (for example Ethernet interface into a PC computer system or cellular network interface into a smartphone computer system). Using any of these networks, computer system (1900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1940) of the computer system (1900).

The core (1940) can include one or more Central Processing Units (CPU) (1941), Graphics Processing Units (GPU) (1942), specialized programmable processing units in the form of Field Programmable Gate Areas (FPGA) (1943), hardware accelerators for certain tasks (1944), and so forth. These devices, along with Read-only memory (ROM) (1945), Random-access memory (1946), internal mass storage such as internal non-user accessible hard drives, SSDs, and the like (1947), may be connected through a system bus (1948). In some computer systems, the system bus (1948) can be accessible in the form of one or more physical plugs to enable extensions by additional CPUs, GPU, and the like. The peripheral devices can be attached either directly to the core's system bus (1948), or through a peripheral bus (1949). Architectures for a peripheral bus include PCI, USB, and the like.

CPUs (1941), GPUs (1942), FPGAs (1943), and accelerators (1944) can execute certain instructions that, in combination, can make up the aforementioned computer code. That computer code can be stored in ROM (1945) or RAM (1946). Transitional data can be also be stored in RAM (1946), whereas permanent data can be stored for example, in the internal mass storage (1947). Fast storage and retrieve to any of the memory devices can be enabled through the use of cache memory, that can be closely associated with one or more CPU (1941), GPU (1942), mass storage (1947), ROM (1945), RAM (1946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1900), and specifically the core (1940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1940) that are of non-transitory nature, such as core-internal mass storage (1947) or ROM (1945). The software implementing various embodiments of the present disclosure can be stored in such devices and executed by core (1940). A computer-readable medium can include one or more memory devices or chips, according to particular needs. The software can cause the core (1940) and specifically the processors therein (including CPU, GPU, FPGA, and the like) to execute particular processes or particular parts of particular processes described herein, including defining data structures stored in RAM (1946) and modifying such data structures according to the processes defined by the software. In addition or as an alternative, the computer system can provide functionality as a result of logic hardwired or otherwise embodied in a circuit (for example: accelerator (1944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
   decoding, with processing circuitry of the decoder, prediction information of a current block within a current picture from a coded video bitstream, the prediction information including a flag indicating that a non-current picture reference (non-CPR) compatible (NCC) inter coding mode is used for the current block, wherein the NCC inter coding mode is at least one of an affine mode, a merge with motion vector difference (MMVD) mode, a triangle partition mode, or an intra-inter mode;
   determining, with the processing circuitry of the decoder, that both conditions (i) and (ii) are true for the current block, where (i) is true when the flag indicates that the NCC inter coding mode is used for the current block and (ii) is true when all motion vector candidates of the current block use the current picture as a reference picture, wherein, in response to the determination that (i) and (ii) are true for the current block, the coded video bitstream is determined as invalid; and
   reconstructing samples of the current block based on a default motion vector using a reference picture other than the current picture.

2. The method of claim 1, wherein
   the determining that (i) the flag indicates that the NCC inter coding mode is used for the current block and that (ii) all motion vector candidates of the current block use the current picture as the reference picture is performed in response to a determination that the NCC inter coding mode has excluded a motion vector candidate pointing to the current picture as the reference picture during a derivation process for determining a motion vector for the current block.

3. The method of claim 1, further comprising:
   determining that the coded video bitstream is invalid in response to a determination that a reference picture list includes only the current picture.

4. The method of claim 1, further comprising:
   in response to a determination that only the current picture is a reference picture for the current block, inferring a flag indicating that the NCC inter coding mode is not used for the current block.

5. The method of claim 1, further comprising:
   in response to a determination that there are plural merge indexes for selecting a motion vector from multiple candidates, using default motion vectors pointing to different reference pictures in a circular manner to form merge candidates.

6. The method of claim 1, wherein
   the default motion vector is a zero motion vector using the reference picture other than the current picture in a reference picture list.

7. The method of claim 1, further comprising:
   excluding the current picture as the reference picture for zero motion vector candidates during a construction of a merge list.

8. A method for video decoding in a decoder, comprising:

decoding prediction information of a current block within a current picture from a coded video bitstream, the prediction information indicates that advanced temporal motion vector prediction (ATMVP) is used for the current block;

selecting a designated reference picture for ATMVP for the current block independently of any merge candidate of the current block;

identifying a reference picture of a merge candidate of the current block;

in response to a determination that the reference picture of the merge candidate is not the current picture and not the designated reference picture for ATMPV, scaling a motion vector of the merge candidate based on the reference picture of the merge candidate and the designated reference picture for ATMPV to determine a reference block in the designated reference picture for ATMPV;

in response to a determination that the reference picture of the merge candidate is the current picture, determining the reference block in the designated reference picture for ATMPV by applying a block vector of the merge candidate without scaling to the designated reference picture for ATMPV, such that (i) the block vector associated with the current picture in the merge candidate is instead applied to the designated reference picture for ATMPV different from the current picture and (ii) the block vector points from a collocated block of the current block in the designated reference picture for ATMPV to the reference block in the designated reference picture for ATMPV;

determining respective motion information of sub-blocks of the current block based on corresponding sub-blocks of the reference block; and reconstructing samples of the sub-blocks of the current block based on the respective motion information of the sub-blocks.

9. An apparatus for video decoding, comprising:

processing circuitry configured to:

decode prediction information of a current block within a current picture from a coded video bitstream, the prediction information including a flag indicating that a non-current picture reference (non-CPR) compatible (NCC) inter coding mode is used for the current block, wherein the NCC inter coding mode is at least one of an affine mode, a merge with motion vector difference (MMVD) mode, a triangle partition mode, or an intra-inter mode;

determine that both conditions (i) and (ii) are true for the current block, where (i) is true when the flag indicates that the NCC inter coding mode is used for the current block and (ii) is true when all motion vector candidates of the current block use the current picture as a reference picture, wherein in response to the determination that (i) and (ii) are true for the current block, the coded video bitstream is determined as invalid; and reconstruct samples of the current block based on a default motion vector using a reference picture other than the current picture.

10. The apparatus of claim 9, wherein the processing circuitry is configured to perform the determining that (i) the flag indicates that the NCC inter coding mode is used for the current block and that (ii) all motion vector candidates of the current block use the current picture as the reference picture in response to a determination that the NCC inter coding mode has excluded a motion vector candidate pointing to the current picture as the reference picture during a derivation process for determining a motion vector for the current block.

11. The apparatus of claim 10, wherein the processing circuitry is configured to:

determine that the coded video bitstream is invalid in response to a determination that a reference picture list includes only the current picture.

12. The method of claim 1, wherein the flag includes at least one of usage flags for the MMVD mode, the triangle partition mode, and the intra-inter mode.

* * * * *